(12) United States Patent
Wang et al.

(10) Patent No.: US 11,177,849 B2
(45) Date of Patent: Nov. 16, 2021

(54) MULTIMODE TRANSCEIVING

(71) Applicant: Qualcomm Incorporated, San Diego, CA (US)

(72) Inventors: Chuan Wang, San Diego, CA (US); Li Liu, San Diego, CA (US); Kevin Hsi-Huai Wang, San Diego, CA (US); Bhushan Shanti Asuri, San Diego, CA (US); Kang Yang, San Diego, CA (US); Shrenik Patel, Rancho Santa Fe, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/039,775

(22) Filed: Sep. 30, 2020

(65) Prior Publication Data
US 2021/0099197 A1 Apr. 1, 2021

Related U.S. Application Data

(60) Provisional application No. 62/908,723, filed on Oct. 1, 2019.

(51) Int. Cl.
*H04B 1/401* (2015.01)
(52) U.S. Cl.
CPC .................. *H04B 1/401* (2013.01)
(58) Field of Classification Search
CPC .............. H04B 1/401; H03G 3/20; H03F 1/32
See application file for complete search history.

(56) References Cited

U.S. PATENT DOCUMENTS

| | | | |
|---|---|---|---|
| 2003/0146790 A1* | 8/2003 | Arell ....................... | G05F 3/265 330/296 |
| 2009/0258624 A1* | 10/2009 | Gudem ................... | H04B 1/109 455/234.1 |
| 2015/0070097 A1* | 3/2015 | Bauer .................... | H03F 1/0261 330/296 |
| 2016/0126896 A1* | 5/2016 | Choksi .................... | H03F 1/565 330/296 |
| 2019/0173439 A1 | 6/2019 | Dunworth et al. | |

* cited by examiner

*Primary Examiner* — Nguyen T Vo
(74) *Attorney, Agent, or Firm* — Colby Nipper; QUALCOMM Incorporated

(57) ABSTRACT

An apparatus is disclosed for transceiving signals in multiple modes. In example implementations, an apparatus includes a transceiver that includes a first amplifier; a mixer having at least one input node and at least one output node, with the at least one input node coupled to the first amplifier; and a second amplifier coupled to the at least one output node of the mixer. The transceiver also includes a first register coupled to the first amplifier and a second register coupled to the second amplifier. The transceiver further includes at least one memory realizing a lookup table. The at least one memory is coupled to the first register and the second register. The lookup table includes a first portion corresponding to a first mode of the transceiver and a second portion corresponding to a second mode of the transceiver.

31 Claims, 15 Drawing Sheets

MULTIMODE TRANSCEIVING

CROSS-REFERENCE TO RELATED APPLICATION

This application claims the benefit of U.S. Provisional Application No. 62/908,723, filed 1 Oct. 2019, the disclosure of which is hereby incorporated by reference in its entirety herein.

TECHNICAL FIELD

This disclosure relates generally to communications with electronic devices and, more specifically, to a multimode transceiver.

BACKGROUND

Electronic devices include traditional computing devices such as desktop computers, notebook computers, smartphones, wearable devices like a smartwatch, internet servers, and so forth. However, electronic devices also include other types of computing devices such as personal voice assistants, robotics, automotive electronics, thermostats and other sensors or automated controllers, digital components and devices embedded in other machines like refrigerators and industrial tools, Internet of Things (IoT) devices, and so forth. These various electronic devices provide services relating to productivity, communication, social interaction, security, safety, remote management, entertainment, transportation, and information dissemination. Thus, electronic devices play crucial roles in many aspects of modern society.

Many of the services provided by electronic devices in today's interconnected world depend at least partly on electronic communications. Electronic communications include, for example, those exchanged between or among different electronic devices using wireless or wired signals that are transmitted over one or more networks, such as the Internet, a Wi-Fi network, or a cellular network. Electronic communications therefore include both wireless and wired transmissions and receptions. To make such electronic communications, an electronic device uses a transceiver, such as a wireless transceiver.

Electronic communications can therefore be realized by propagating signals between two wireless transceivers at two different electronic devices. For example, using a wireless transmitter, a smartphone can transmit a wireless signal to a base station over an air medium as part of an uplink communication to support mobile services. Using a wireless receiver, the smartphone can receive a wireless signal from the base station via the air medium as part of a downlink communication to enable mobile services. With a smartphone, mobile services can include phone and video calls, social media interactions, messaging, watching movies, sharing videos, performing searches, acquiring map information or navigational instructions, finding friends, location-based services generally, transferring money, ordering a good or service like a car ride, and so forth.

To provide these and other types of services, electronic devices typically use a wireless transceiver to communicate wireless signals in accordance with some wireless standard. Examples of wireless standards include an IEEE 802.11b or 802.11g Wi-Fi standard and a 4th Generation (4G) cellular standard, both of which are used today with smartphones and other connected devices. However, efforts to enable faster wireless networks through the creation of newer wireless standards are ongoing. Next-generation cellular networks and new Wi-Fi networks, for example, are expected to offer significantly higher bandwidths, lower latencies, and access to additional electromagnetic spectrum. Taken together, this means that exciting new wireless services can be provided to users, such as self-driving vehicles, augmented reality (AR) and other mixed reality (MR) imaging, on-the-go 4K video streaming, ubiquitous sensors to keep people safe and to use natural resources more efficiently, real-time language translations, and so forth.

To make these new, faster wireless technologies more widely available, many wireless devices besides smart phones will be deployed, which is sometimes called the "Internet of Things" (IoT). Compared to today's use of wireless devices, tens of billions, and eventually trillions, of more devices are expected to be connected to the internet with the arrival of the Internet of Things. These IoT devices may include small, inexpensive, and low-powered devices, like sensors and tracking tags. Further, 5th Generation (5G) cellular wireless devices, Wi-Fi 6 devices, and devices adhering to Licensed Assisted Access (LAA) schemes may each be communicating with signals that use wider frequency ranges that are located at higher frequencies of the electromagnetic (EM) spectrum as compared to devices that operate in accordance with older wireless standards. For example, some newer devices will be expected to provide channel bandwidths over 20 Megahertz (MHz) and to operate at millimeter wave (mmW) frequencies. These "mmW frequencies" include frequencies between at least 30 and 300 Gigahertz (GHz), but they can also include the 20-30 GHz frequency range and frequencies as low as 3-6 GHz.

To accommodate these commercial expectations and surmount the associated technical hurdles, the components that enable wireless communications under these constraints will be expected to operate efficiently at higher frequencies. One component that facilitates electronic communication is the wireless interface device, which can include a transceiver and a radio-frequency (RF) front-end (RFFE) to communicate using wireless signals. However, the wireless interface devices designed for electronic devices that operate in accordance with the Wi-Fi and 4G cellular standards of today are not adequate for the faster Wi-Fi 6, LAA, and 5G-capable devices of tomorrow because such devices will confront higher frequencies, more-stringent latency demands, and tighter fiscal constraints.

Consequently, to facilitate the adoption of newer and faster wireless technologies, as well as the widespread deployment of wireless interface devices that can provide new capabilities and services, wireless interface devices will be employed having designs that can handle wider channel bandwidths and higher frequencies, including mmW frequencies. Electrical engineers and other designers of electronic devices are therefore striving to develop new wireless interface devices that will enable the promise of Wi-Fi 6, LAA, 5G, and other higher-bandwidth and higher-frequency technologies to become a reality.

SUMMARY

In an example aspect, an apparatus for transceiving signals in multiple modes is disclosed. The apparatus includes a transceiver. The transceiver includes a first amplifier and a second amplifier. The transceiver also includes a mixer having at least one input node and at least one output node. The first amplifier is coupled to the at least one input node of the mixer, and the second amplifier is coupled to the at least one output node of the mixer. The transceiver additionally includes a first register coupled to the first amplifier and a second register coupled to the second amplifier. The transceiver further includes at least one memory having a lookup table. The at least one memory is coupled to the first register and the second register. The lookup table includes a first portion corresponding to a first mode of the transceiver and a second portion corresponding to a second mode of the transceiver.

In an example aspect, a method for transceiving signals in multiple modes is disclosed. The method includes operating a first amplifier in a first frequency domain of a transceiving chain at a first setting based on a first mode and operating a second amplifier in a second frequency domain of the transceiving chain at a second setting based on the first mode. The method also includes detecting a switch from the first mode to a second mode. The method additionally includes, responsive to the detecting, increasing the first setting to a first increased setting and decreasing the second setting to a second decreased setting. The method further includes operating the first amplifier in the first frequency domain at the first increased setting based on the second mode and operating the second amplifier in the second frequency domain at the second decreased setting based on the second mode.

In an example aspect, an apparatus for transceiving signals in multiple modes is disclosed. The apparatus includes a mixer having at least one input node and at least one output node. The apparatus also includes a first amplifier coupled to the at least one input node of the mixer and a second amplifier coupled to the at least one output node of the mixer. The apparatus additionally includes means for establishing a first setting for the first amplifier and a second setting for the second amplifier based on a mode of a transceiver. The apparatus further includes means for adjusting the first setting inversely compared to the second setting responsive to a switch between two modes of the transceiver.

In an example aspect, an apparatus for transceiving signals in multiple modes is disclosed. The apparatus includes a mixer configured to perform frequency conversion between a first frequency domain and a second frequency domain. The apparatus also includes a first amplifier coupled to the mixer in the first frequency domain and a second amplifier coupled to the mixer in the second frequency domain. The apparatus further includes mode control circuitry coupled to the first amplifier and the second amplifier. The mode control circuitry is configured to establish a first bias setting for the first amplifier and a second bias setting for the second amplifier based on a mode. The mode control circuitry is further configured to adjust the first bias setting inversely to the second bias setting responsive to a switch between two modes.

BRIEF DESCRIPTION OF DRAWINGS

FIGS. 3, 3-1, and 3-2 illustrate example architectures to implement mode control circuitry to place a component into different configurations for respective ones of different modes, with the architectures including at least one lookup table and one or more registers.

FIG. 3-3 illustrates an example lookup table including multiple entries, with each entry including an index and associated entry selection bits that can map to the one or more registers of FIG. 3-2.

FIG. 3-4 illustrates an example register including multiple register entries that may hold configuration values and that may correspond to entry selection bits of the lookup table of FIG. 3-3.

FIG. 4-1 illustrates example schemes to operate components in multiple different modes using various configuration values.

FIG. 4-2 illustrates example schemes to operate components in multiple different modes by changing gain configuration values.

FIG. 4-3 illustrates example schemes to operate components in multiple different modes by changing bias configuration values.

DETAILED DESCRIPTION

Figure 1:
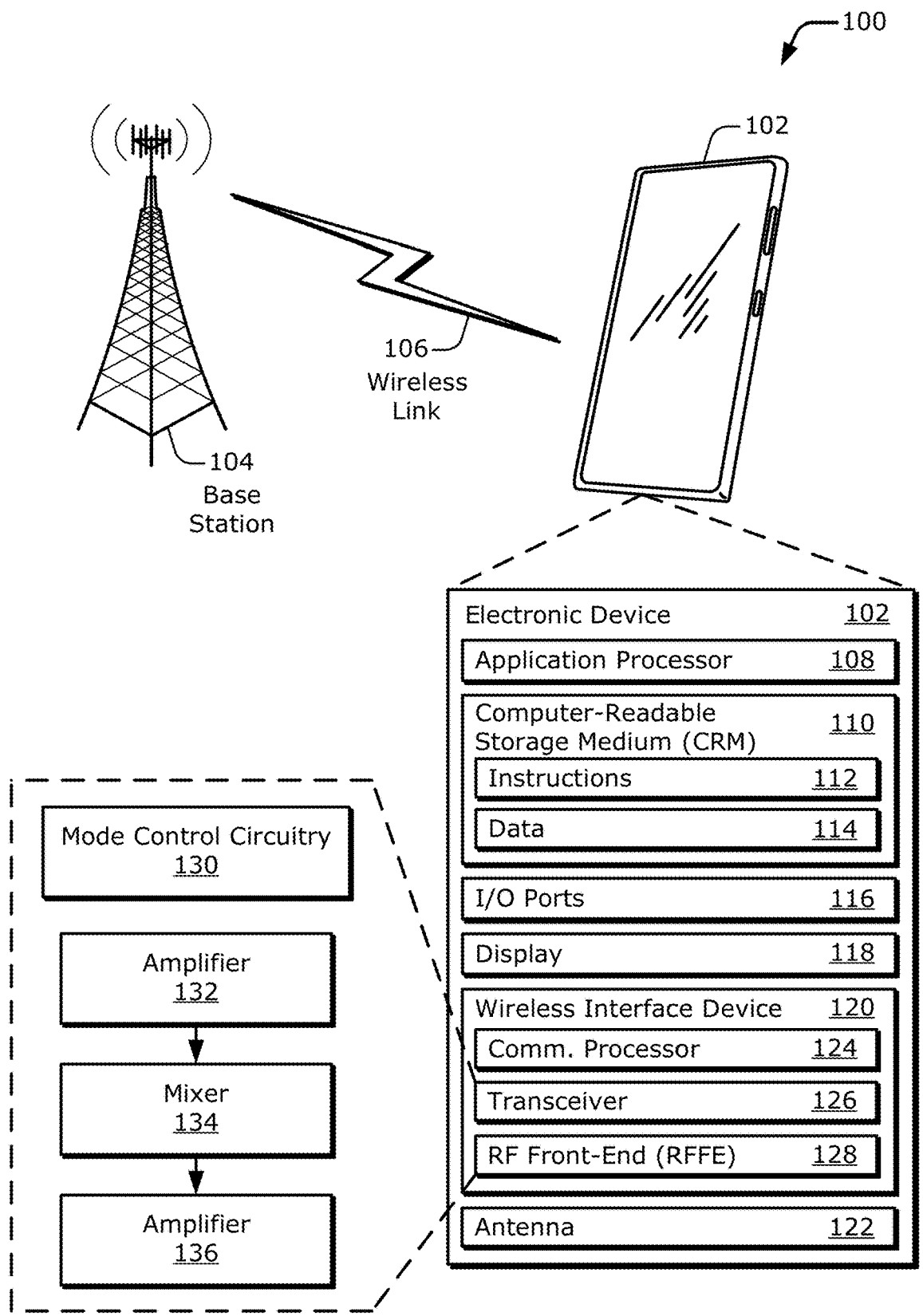
FIG. 1 illustrates an environment depicting an example electronic device having a wireless interface device including a transceiver with mode control circuitry for multiple amplifiers and at least one mixer.

Wireless signals are transmitted from an origin device and received at a destination device after traveling through a propagation medium. The propagation medium, such as the air, attenuates the signals. To ensure that a transmitted signal reaches the destination device with sufficient power to be received, demodulated, and decoded, a link budget is instituted. The link budget accounts for opportunities for the signal to gain or lose power between the origin device and the destination device. Using this link budget metric, a minimum transmit power is determined.

The origin device is responsible for transmitting the wireless signal at this minimum transmit power to ensure the wireless signal reaches the destination device in a satisfactory condition. To do so, the origin device increases a power of a signal as it traverses a transmit chain of a transceiver within the origin device. For example, one or more amplifiers may amplify a signal along the transmit chain such that the minimum transmit power of the link budget is achieved when the signal is wirelessly emanated from an antenna. To achieve the link budget power threshold, the origin device sets power levels for individual amplifiers along the transmit chain, which is referred to as a gain lineup. This gain line up can be varied by varying the individual respective gains of respective components coupled along the transmit chain, but the resulting total gain lineup is established to meet the link budget power threshold for transmission. Different gain lineups that each achieve a same transmit power can, however, consume different amounts of power.

Some transmission technologies, such as that for 5G mmW transmissions, have different operational modes based on different waveforms and associated configurations.

For example, various waveforms can have different thresholds for a peak-to-average power ratio (PAPR) or a peak-to-average ratio (PARR). For waveforms with a relatively low PARR (e.g., quadrature phase shift keying (QPSK)), a relatively lower or less stringent specification is invoked in several wireless performance categories. These categories can include error vector magnitude (EVM), adjacent-channel-leakage power ratio (ACLR), in-band emission (IBE) power of transmitters transmitting on subchannels, and so forth. In contrast, for waveforms with a relatively high PARR (e.g., 64 quadrature amplitude modulation (64-QAM)), the invoked specifications (e.g., for EVM, ACLR, or IBE) are more stringent and more difficult to meet. Accordingly, different EVM/ACLR/IBE specifications can drive different transmit chain gain lineup budgets or bias optimization points for the components of the transmit chain.

In some environments or with some wireless standards, the applicable specifications can be met generally by achieving higher linearity requirements, such as those for 64 QAM that involve amplitude modulation to phase modulation (AMPM) optimization with high quiescent bias current. Achieving higher linearity, however, results in a power utilization that impacts efficiency across an entire power-out range because the highest power utilization is effectively adopted across the entire power-out range. Further, due to high quiescent biasing to meet the higher linearity requirements of a higher linearity mode, particularly at the power amplifier stage, the signal path gain lineup in the transmit chain is also established based on the power of the power amplifier (PA). Consequently, the minimum power output that can be configured across different waveforms is also limited. With the resulting constrained gain lineup, spurious performance can also be limited in a lower linearity mode, which can adversely impact user equipment (UE) or base station (BS) performance by including a post-PA filter.

To avoid using higher power levels when lower power levels will otherwise suffice, a different gain lineup or bias point can be used with, e.g., the lower linearity mode. In other words, a different gain lineup or different bias optimization points can be used between multiple transceiver modes, such as a higher linearity mode and a lower linearity mode. It can be challenging, however, to switch transceiver modes sufficiently quickly to meet the stringent latency demands of 5G and other standards that operate at mmW frequencies. It is therefore difficult to achieve the power efficiency that is attainable from switching transceiver modes using different bias and gain configuration values.

To address these challenges and difficulties, in example implementations, a multimode transceiver with mode control is employed. The multimode transceiver enables faster mode switching as compared to downloading register settings each time a mode switch is enacted. Instead, registers are configured initially and "forward-deployed," or positioned closer to transceiving components that are to be configured for different operational modes—e.g., using bias settings or gain settings, or both. A lookup table is included that maps a desired specified operational configuration to a selected configuration value stored at the registers that are proximate to the components being configured. Further, entries of the lookup table can be stored in multiple forms for multiple different modes of operation for the transceiver. For example, a first portion of the lookup table may include mapping entries for a first mode, and a second portion of the lookup table may include mapping entries for a second mode.

Thus, new configuration values need not be pushed to transceiving components each time the transceiver switches modes. Further, the lookup table need not be reinitialized upon each mode change. Instead, a different portion of the lookup table can be accessed to determine or establish a different set of configurations values that are to be selected from those stored by the registers associated with the transceiving components to implement a new mode. In these manners, different configuration values can be utilized to configure transmit or receive chain components of a transceiver based on mode control circuitry that accesses an appropriate portion of a lookup table. A controller of the mode control logic, responsive to a mode control signal, activates those configuration values that are mapped to a combination of the indicated mode and the specified link budget configuration. The respective transceiving component then operates based on the activated configuration values of the associated respective register.

Examples of transceiving components (e.g., a transmitter component, a receiver component, or a combined transmitter and receiver component) along a transmit chain or a receive chain include amplifiers, mixers, and other components that use power or that can provide a gain along the transmit chain or the receive chain. The gain lineup budgets can be established, for instance, so as to lower power consumption with signal waveforms that can withstand lower linearity performance from the transmit chain or the receive chain. Thus, implementations of a multimode transceiver with mode control can be realized with a transmitter, a receiver, or both as part of a given transceiver.

In example aspects, transceiver modes include a lower linearity mode and a higher linearity mode. A transmit chain or receive chain architecture may include two amplifiers, one amplifier on each side of a mixer that upconverts or downconverts a frequency of a signal. Thus, each amplifier may be disposed in a different frequency domain. In some cases, the adjustments to gain settings of the two amplifiers that are in different frequency domains are inverted for different modes. For instance, if a first amplifier has a lower gain and a second amplifier has a higher gain in one mode, the first amplifier has a relatively higher gain and the second amplifier has a relatively lower gain in another mode. In other cases, the bias settings of the two amplifiers that are in different frequency domains are changed in an inverted manner between different modes. Thus, if a bias setting is increased for a first amplifier in a first frequency domain responsive to switching from a first mode to a second mode, the bias setting is decreased for a second amplifier in a second frequency domain responsive to switching from the first mode to the second mode. The inverted gain or bias settings can both attain a desired gain lineup or transmit power across both modes while increasing efficiency, as described herein.

FIG. 1 illustrates an example environment 100 depicting an electronic device 102 having a wireless interface device 120 including a transceiver 126 with mode control circuitry 130 for multiple amplifiers 132 and 136 and at least one mixer 134. As depicted in FIG. 1, an amplifier 132 is coupled to one side (e.g., to an input node) of the mixer 134, and another amplifier 136 is coupled to another side (e.g., to an output node) of the mixer 134. If the mixer 134 performs frequency translation, two frequency domains (e.g., a first frequency domain and a second frequency domain) are created. Thus, each of the two amplifiers 132 and 136 may be in a different frequency domain, as is described below with reference to FIG. 4-1.

In the environment 100, the example electronic device 102 communicates with a base station 104 through a wireless link 106. In FIG. 1, the electronic device 102 is depicted as a smartphone. However, the electronic device 102 may be implemented as any suitable computing or other electronic device. Examples include a cellular base station, broadband router, access point, cellular or mobile phone, gaming device, navigation device, media device, laptop computer, desktop computer, tablet computer, server computer, network-attached storage (NAS) device, smart appliance, vehicle-based communication system, Internet of Things (IoT) device, sensor or security device, asset tracker, fitness management device, wearable device such as intelligent glasses or smart watch, wireless power device (transmitter or receiver), medical device, and so forth.

The base station 104 communicates with the electronic device 102 via the wireless link 106, which may be implemented as any suitable type of wireless link that carries a wireless communication signal. Although depicted as a base station tower of a cellular radio network, the base station 104 may represent or be implemented as another device, such as a satellite, terrestrial broadcast tower, access point, peer-to-peer device, mesh network node, fiber optic line, another electronic device as described above generally, and so forth. Hence, the electronic device 102 may communicate with the base station 104 or another device via a wired connection, a wireless connection, or a combination thereof.

The wireless link 106 extends between the electronic device 102 and the base station 104. The wireless link 106 can include a downlink of data or control information communicated from the base station 104 to the electronic device 102, an uplink of other data or control information communicated from the electronic device 102 to the base station 104, or both a downlink and an uplink. The wireless link 106 may be implemented using any suitable communication protocol or standard. Examples of such protocols and standards include a 3rd Generation Partnership Project Long-Term Evolution (3GPP LTE) standard, such as a 4th Generation (4G) or a 5th Generation (5G) cellular standard; an IEEE 802.11 standard, such as 802.11g, ac, ax, ad, aj, or ay standard; an IEEE 802.16 standard (e.g., WiMAX™); a Bluetooth™ standard; and so forth. In some implementations, the wireless link 106 may wirelessly provide power instead of or in addition to communication signaling, and the electronic device 102 or the base station 104 may comprise a power source or a power sink.

As shown, the electronic device 102 includes at least one application processor 108 and at least one computer-readable storage medium 110 (CRM 110). The application processor 108 may include any type of processor, such as a central processing unit (CPU) or a multi-core processor, that is configured to execute processor-executable instructions (e.g., code) stored by the CRM 110. The CRM 110 may include any suitable type of data storage media, such as volatile memory (e.g., random-access memory (RAM)), non-volatile memory (e.g., Flash memory), optical media, magnetic media (e.g., disk or tape), and so forth. In the context of this disclosure, the CRM 110 is implemented to store instructions 112, data 114, and other information of the electronic device 102, and thus the CRM 110 does not include transitory propagating signals or carrier waves.

The electronic device 102 may also include one or more input/output ports 116 (I/O ports 116) and at least one display 118. The I/O ports 116 enable data exchanges or interaction with other devices, networks, or users. The I/O ports 116 may include serial ports (e.g., universal serial bus (USB) ports), parallel ports, audio ports, infrared (IR) ports, camera or other sensor ports, and so forth. The display 118 can be realized as a display screen or a projection that presents one or more graphical images provided by the electronic device 102, such as a user interface associated with an operating system, program, or application. Alternatively or additionally, the display 118 may be implemented as a display port or virtual interface through which graphical content of the electronic device 102 is communicated or presented.

The electronic device 102 further includes at least one wireless interface device 120 and at least one antenna 122, which are coupled one to another. The wireless interface device 120 provides connectivity to respective networks and peer devices via a wireless link, which may be configured similar to or differently from the wireless link 106. Alternatively or additionally, the electronic device 102 may include a wired interface device, such as an Ethernet or fiber optic transceiver for communicating over a wired local area network (LAN), an intranet, or the Internet. The wireless interface device 120 may facilitate communication over any suitable type of wireless network, such as a wireless LAN (WLAN), wireless personal-area-network (PAN) (WPAN), peer-to-peer (P2P) network, mesh network, cellular network, wireless wide-area-network (WAN) (WWAN), and/or a navigational network (e.g., the Global Positioning System (GPS) of North America or another Satellite Positioning System (SPS) or Global Navigation Satellite System (GNSS)). In the context of the example environment 100, the electronic device 102 can communicate various data and control information bidirectionally with the base station 104 using the wireless interface device 120. However, the electronic device 102 may also or instead communicate directly with peer devices, an alternative wireless network, and the like.

As shown, the wireless interface device 120 includes at least one communication processor 124, at least one transceiver 126, and at least one RF front-end 128 (RFFE 128). The communication processor 124 can be coupled to the transceiver 126, and the transceiver 126 can be coupled to the RF front-end 128, which is coupled to the antenna 122. These components process data information, control information, and signals associated with communicating information for the electronic device 102 via the antenna 122. The communication processor 124 may be implemented as part of a system-on-chip (SoC), as a modem baseband processor, or as a baseband radio processor (BBP) that realizes a digital communication interface for data, voice, messaging, or other applications of the electronic device 102. The communication processor 124 includes a digital signal processor (DSP) or one or more signal-processing blocks (not shown) for encoding and modulating data for transmission and for demodulating and decoding received data. Additionally, the communication processor 124 may also manage (e.g., control or configure) aspects or operation of the transceiver 126 (e.g., the mode control circuitry 130), the RF front-end 128, and other components of the wireless interface device 120 to implement various communication protocols or communication techniques, including those that are described herein.

In some cases, the application processor 108 and the communication processor 124 can be combined into one module or integrated circuit (IC), such as an SoC. Regardless, the application processor 108 or the communication processor 124 can be operatively coupled to one or more other components, such as the CRM 110 or the display 118. This operative coupling enables control of, or other interaction with, the other components of the electronic device 102 by at least one processor. Additionally, the communication processor 124 may also include a memory (not separately shown), such as a CRM 110, to store data and processor-executable instructions (e.g., code). The various components illustrated in FIG. 1, FIG. 2, and so forth using separate schematic blocks may be manufactured or packaged in different discrete manners. For example, one physical module may include components of the RF front-end 128 and some components of the transceiver 126, and another physical module may combine the communication processor 124 with the remaining components of the transceiver 126. Further, the antenna 122 may be co-packaged with at least some components of the RF front-end 128 or the transceiver 126, as is described below with reference to FIGS. 5 and 6.

The transceiver 126 includes circuitry and logic for filtering, amplification, channelization, and frequency translation. The frequency translation may include an up-conversion or a down-conversion of frequency that is performed in a single conversion operation (e.g., with a direct-conversion architecture) or through multiple conversion operations (e.g., with a superheterodyne architecture) using one or more mixers, such as the mixer 134. Thus, the transceiver 126 can include filters, switches, amplifiers, mixers, and so forth for routing and conditioning signals that are transmitted or received via the antenna 122. Although not explicitly shown in FIG. 1, the wireless interface device 120 can also include a digital-to-analog converter (DAC) or an analog-to-digital converter (ADC) to convert between analog signals and digital signals. A DAC or an ADC can be implemented as part of the communication processor 124, as part of the transceiver 126, or separately from both of them.

Configurable components of the transceiver 126, such as the amplifier 132 or the amplifier 136, may be controlled by the communication processor 124 to implement communications in various modes, with different frequency bands, or to comport with a particular wireless standard. The components or circuitry of the transceiver 126 can be implemented in any suitable fashion, such as with combined transceiver logic or separately as respective transmitter and receiver entities. In some cases, the transceiver 126 is implemented with multiple or different sections to implement respective transmitting and receiving operations (e.g., to implement separate transmit and receive chains). The transceiver 126 may also include logic to perform in-phase/quadrature (I/Q) operations, such as synthesis, phase correction, modulation, demodulation, and the like.

Generally, the RF front-end 128 includes one or more filters, switches, amplifiers, or phase shifters for conditioning signals received via the antenna 122 or signals to be transmitted via the antenna 122. The RF front-end 128 may also include other RF sensors and components, such as a peak detector, power meter, gain control block, antenna tuning circuit, diplexer, balun, and the like. Configurable components of the RF front-end 128, such as a phase shifter or mixer, may be controlled by the communication processor 124 to implement communications in various modes, with different frequency bands, or using beamforming. The RF front-end 128 of the wireless interface device 120 is coupled to the antenna 122. The antenna 122 can be implemented as at least one individual antenna, as at least one antenna array that includes multiple antenna elements, or as at least one antenna element of an antenna array. Thus, as used herein, an "antenna" can refer to an individual antenna, an antenna array, or an antenna element of an antenna array, depending on context.

In example implementations, the transceiver 126 or the RF front-end 128 includes at least one amplifier 132, at least one mixer 134, at least one amplifier 136, and mode control circuitry 130. More specifically, an output node of a first amplifier 132 is coupled to an input node of the mixer 134, and an output node of the mixer 134 is coupled to an input node of the second amplifier 136. In some cases, the transceiver 126 can include multiple instances of the first amplifier 132 on the input side of the mixer 134. Such multiple instances of the first amplifier 132 can be arranged in series or in parallel with respect to each other, including both in series and in parallel. The transceiver 126 can also include multiple instances of the second amplifier 136 on the output side of the mixer 134. The multiple instances of the second amplifier 136 can be arranged in series or in parallel with respect to each other, including both.

In alternative implementations, at least some of the components depicted as being part of the transceiver 126 can alternatively be realized as part of another one or more components or sections of the electronic device 102. For example, the components can be distributed through all or part of the wireless interface device 120. For instance, the mode control circuitry 130 can be separated into parts and realized partially in the transceiver 126 and partially in the RF front-end 128. Further, the mixer 134 and/or the amplifier 136 may be implemented as part of the RF front-end 128.

Example implementations of the amplifiers 132 and 136 and the mixer 134 are described herein below starting with FIG. 2. The mode control circuitry 130 includes circuits and/or digital or analog components to establish different modes for the transceiver 126. The mode control circuitry 130 can include at least one lookup table (LUT) and one or more configuration values that are realized using at least one memory, one or more registers, and so forth. The configuration values can configure the amplifiers 132 and 136 or the mixer 134 in terms of bias (e.g., voltage or current bias) or in terms of gain, including both bias and gain. The configurations can be established responsive to a mode control signal, which may be provided by the communication processor 124. The mode control signal can select between two or more of multiple transceiver modes that have, for example, different linearity properties. For instance, the transceiver 126 can enable a lower linearity mode and a higher linearity mode. Example implementations of the mode control circuitry 130 are described below starting with FIG. 3. Next, however, example implementations of a wireless interface device 120, including aspects of the transceiver 126, are described with reference to FIG. 2.

Figure 2:
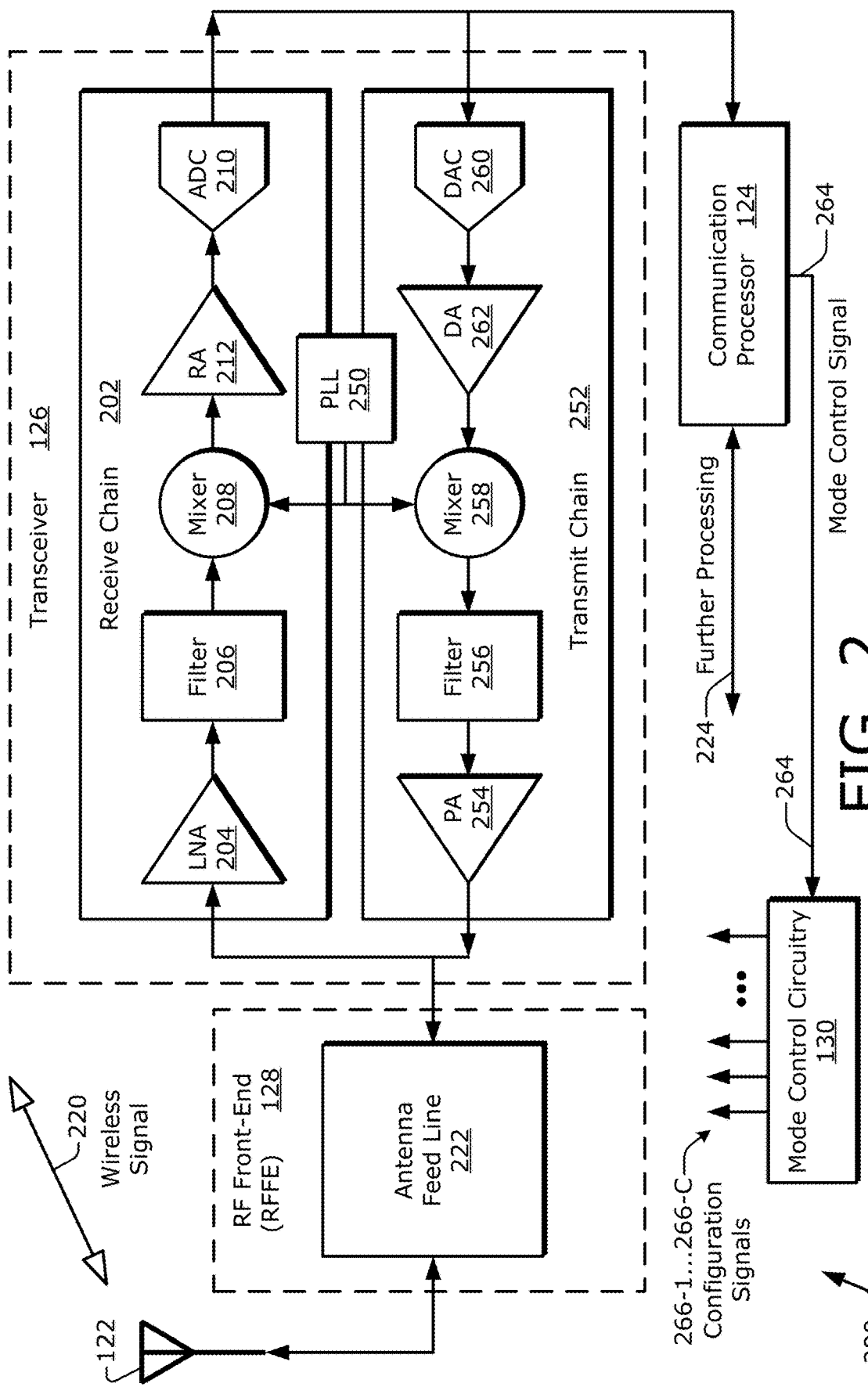
FIG. 2 illustrates an example transceiver that includes multiple amplifiers and at least one mixer for a transmit chain and a receive chain that can implement multimode transceiving.

FIG. 2 illustrates an example transceiver 126 that includes multiple amplifiers and at least one mixer that can implement multimode transceiving. At 200 generally, FIG. 2 depicts the antenna 122, the RF front-end 128, the transceiver 126, and the communication processor 124. As illustrated from left to right, the antenna 122 is coupled to the RF front-end 128, and the RF front-end 128 is coupled to the transceiver 126. The transceiver 126 is coupled to the communication processor 124. The example RF front-end 128 includes at least one antenna feed line 222. The example transceiver 126 includes at least one receive chain 202 and at least one transmit chain 252. Although only one RF front-end 128, one transceiver 126, and one communication processor 124 are shown, an electronic device 102, or a wireless interface device 120 thereof, can include multiple instances of any or all such components. Also, although only certain components are explicitly depicted in FIG. 2 and are shown coupled together in a particular manner, the transceiver 126 may include other non-illustrated components, more or fewer components, differently-coupled arrangements of components, and so forth.

In some implementations, the RF front-end 128 couples the antenna 122 to the transceiver 126 via the antenna feed line 222. In operation, the antenna feed line 222 propagates a signal between the antenna 122 and the transceiver 126. During or as part of the propagation, the antenna feed line 222 conditions the propagating signal. This enables the RF front-end 128 to couple one or more wireless signals 220 from the antenna 122 to the transceiver 126 as part of a reception operation. The RF front-end 128 also enables a transmission signal to be coupled from the transceiver 126 to the antenna 122 as part of a transmission operation to emanate one or more wireless signals 220. Although not explicitly shown in FIG. 2, an RF front-end 128, or an antenna feed line 222 thereof, may include one or more other components, such as a filter, an amplifier (e.g., a power amplifier or a low-noise amplifier), an N-plexer, and so forth. Further, such amplifiers of the RF front-end 128 may be configured differently for various modes using one or more registers and at least one lookup table as described herein for multimode transceiving.

In some implementations, the transceiver 126 can include at least one receive chain 202, at least one transmit chain 252, or both at least one receive chain 202 and at least one transmit chain 252. The receive chain 202 includes a low-noise amplifier 204 (LNA 204), a filter 206, a mixer 208 for frequency down-conversion, a receiver amplifier 212 (RA 212), and an ADC 210. The transmit chain 252 includes a power amplifier 254 (PA 254), a filter 256, a mixer 258 for frequency up-conversion, a driver amplifier 262 (DA 262), and a DAC 260. However, the receive chain 202 or the transmit chain 252 can include other components—such as additional amplifiers or filters, multiple mixers, one or more buffers, or at least one local oscillator—that are electrically coupled anywhere along the depicted receive and transmit chains.

The receive chain 202 is coupled between the antenna feed line 222 of the RF front-end 128 and the communication processor 124—e.g., via the low-noise amplifier 204 and the ADC 210, respectively. The transmit chain 252 is coupled between the antenna feed line 222 and the communication processor 124—e.g., via the power amplifier 254 and the DAC 260, respectively. The transceiver 126 can include at least one phase-locked loop (PLL) 250, one PLL for each receive/transmit chain pair, one PLL per receive chain and one PLL per transmit chain, multiple PLLs, and so forth. Although depicted separately, the mode control circuitry 130 can be incorporated as part of, or integrated with, the transceiver 126, the RF front-end 128, some combination thereof, and so forth.

As shown for the receive chain 202, the antenna 122 is coupled to the low-noise amplifier 204 via the antenna feed line 222, and the low-noise amplifier 204 is coupled to the filter 206. The filter 206 is coupled to the mixer 208, and the mixer 208 is coupled to the receiver amplifier 212. The receiver amplifier 212 is further coupled to the ADC 210. The ADC 210 is in turn coupled to the communication processor 124. As shown for the transmit chain 252, the DAC 260 is coupled to the communication processor 124. The DAC 260 is also coupled to the driver amplifier 262. The driver amplifier 262 is further coupled to the mixer 258. The mixer 258 is coupled to the filter 256, and the filter 256 is coupled to the power amplifier 254. The power amplifier 254 is coupled to the antenna 122 via the antenna feed line 222. Although only one receive chain 202 and one transmit chain 252 are explicitly shown, an electronic device 102, or a transceiver 126 thereof, can include multiple instances of either or both components.

An example signal-receiving operation that includes the receive chain 202 of the transceiver 126 is now described. As part of the signal-receiving operation, the antenna 122 receives a wireless signal 220. The antenna 122 can be implemented as an individual antenna, as an antenna array, as an antenna element of an antenna array, and so forth. The antenna 122 provides the wireless signal 220 to the RF front-end 128, and the RF front-end 128 uses the antenna feed line 222 to forward the corresponding wired signal to the transceiver 126. Thus, the antenna 122 provides the wireless signal 220 to the low-noise amplifier 204 of the receive chain 202 after conditioning or other signal manipulation by the antenna feed line 222. The low-noise amplifier 204 amplifies the manipulated signal to produce an amplified signal. The low-noise amplifier 204 provides the amplified signal to the filter 206. The filter 206 filters (e.g., low-pass filters or bandpass filters) the amplified signal by attenuating some range or ranges of frequencies to produce a filtered signal that has one or more frequency bands attenuated. The filter 206 provides the filtered signal to the mixer 208.

The mixer 208 performs frequency conversion on the filtered signal to down-convert from one frequency to a lower frequency, such as from a radio frequency (RF) to an intermediate frequency (IF), from an IF to a baseband frequency (BBF), from a RF directly to a BBF, and so forth. The mixer 208 can perform the frequency down-conversion in a single conversion step, or through multiple conversion steps, using at least one PLL 250 that generates a signal having a synthesized frequency. Thus, the mixer 208 accepts the filtered signal and performs a frequency down-conversion operation on the filtered signal to produce a down-converted signal.

The mixer 208 provides the down-converted signal to the receiver amplifier 212. The receiver amplifier 212 amplifies the down-converted signal and provides an amplified down-converted signal to the ADC 210. The ADC 210 converts the analog down-converted signal to a digital signal. The ADC 210 provides the digital signal to the communication processor 124. The communication processor 124 can perform demodulation, decoding, and so forth on the digital signal to produce a data signal. The communication processor 124 then provides the data signal to other components, such as the application processor 108 (of FIG. 1), for further processing at 224 (e.g., for processing at an application level) to display images on a screen, conduct a transaction, and so forth.

As part of an example signal-transmitting operation that includes the transmit chain 252, the DAC 260 accepts a digital signal from the communication processor 124. The DAC 260 converts the digital signal to an analog signal, which is at a baseband frequency (BBF) or an intermediate frequency (IF). The DAC 260 forwards the analog signal to the driver amplifier 262, and the driver amplifier 262 amplifies the analog signal to produce an amplified analog signal. The driver amplifier 262 couples the amplified analog signal to the mixer 258.

The mixer 258 accepts the amplified analog signal from the driver amplifier 262 and upconverts the amplified analog signal to a higher frequency, such as an RF frequency, to produce an RF signal. The mixer 258 produces the RF signal using a signal generated by the PLL 250 that has a synthesized frequency that is derived from a local oscillator (LO) (not shown in FIG. 2). The mixer 258 provides the RF signal to the filter 256. The filter 256 filters the RF signal to attenuate one or more frequency ranges and produces a filtered signal, which the filter 256 provides to the power amplifier 254. The power amplifier 254 amplifies the filtered signal to generate an amplified signal. The power amplifier 254 drives the amplified signal onto the antenna feed line 222 for signal conditioning. The RF front-end 128 provides the conditioned signal to the antenna 122 for emanation as another wireless signal 220.

Example implementations that are described above include at least two amplifiers in each of the receive chain 202 and the transmit chain 252. Each amplifier in each chain is described as being disposed in a different frequency domain—e.g., on opposite sides of a frequency-translating mixer, such as the mixer 208 or the mixer 258. Each mixer 208 or 258 receives a signal and produces a frequency-converted signal to create at least two frequency domains. Thus, in this example for the transmit chain 252, the driver amplifier 262 is on one side of the mixer 258 (e.g., in an IF domain), and the power amplifier 254 is on the other side of the mixer 258 (e.g., in an RF domain). Similarly, in this example for the receive chain 202, the receiver amplifier 212 is on one side of the mixer 208 (e.g., in the IF domain), and the low-noise amplifier 204 is on the other side of the mixer 208 (e.g., in the RF domain). For a receive chain 202 implementation, the low-noise amplifier 204, the mixer 208, and the receiver amplifier 212 can respectively correspond to the amplifier 132, the mixer 134, and the amplifier 136 as depicted in, e.g., FIGS. 1 and 4-1 to 4-3 for different frequency domains. For a transmit chain 252 implementation, the driver amplifier 262, the mixer 258, and the power amplifier 254 can respectively correspond to the amplifier 132, the mixer 134, and the amplifier 136 (e.g., of FIGS. 1 and 4-1 to 4-3).

In example operations, the communication processor 124, based on some preliminary synchronization operations, can know the targeted transmitter or receiver signaling parameters, including but not limited to bandwidth, PARR, power range, maximum transmitted power, channel, frequency, modulation waveform, or other such information. With this information, the communication processor 124 can generate a mode control signal 264 based on targeted parameters of the wireless signal. The mode control signal 264 can be based on, for example, a peak-to-average power ratio (PAPR) for the wireless signal 220, a selected modulation waveform, the available or assigned bandwidth, and so forth. The communication processor 124 provides the mode control signal 264 to the mode control circuitry 130.

The mode control circuitry 130 produces one or more configuration signals 266-1 . . . 266-C based on the mode control signal 264, with the variable "C" representing a positive integer. Each configuration signal 266 can be routed directly or indirectly to at least one register (not shown in FIG. 2) associated with a component of the wireless interface device 120 (of FIG. 1), such as a component of the transceiver 126 or the RF front-end 128. Examples of such components, for the transmit chain 252, include the driver amplifier 262, the mixer 258, and the power amplifier 254. Examples of such components, for the receive chain 202, include the receiver amplifier 212, the mixer 208, and the low-noise amplifier 204. Each configuration signal 266 establishes a configuration setting for at least one component of the receive chain 202 or the transmit chain 252. Examples of such configuration settings include a bias value (e.g., a current or a voltage setting), a gain value (e.g., a decibel (dB) gain setting), and so forth. Examples of these configuration settings are described further herein below.

Relevant transceiving components can include the amplifier 132, the mixer 134, the amplifier 136, and the mode control circuitry 130, as illustrated in FIGS. 1 and 2. Corresponding components, as shown in FIG. 2, include the low-noise amplifier 204, the mixer 208, the receiver amplifier 212, the driver amplifier 262, the mixer 258, and the power amplifier 254. Although these components are depicted in particular manners or as being part of a given other component or section of an electronic device 102, such components may be distributed across the wireless interface device 120 in different manners. For example, any portion of the relevant transceiving components may be distributed across the RF front-end 128, the transceiver 126, and so forth for transmitting or receiving purposes. Thus, the receive chain 202 or the transmit chain 252 can extend into the RF front-end 128. Examples of different positioning of the relevant transceiving components are described below and depicted in various drawings, such as FIGS. 5-7.

Figure 3:
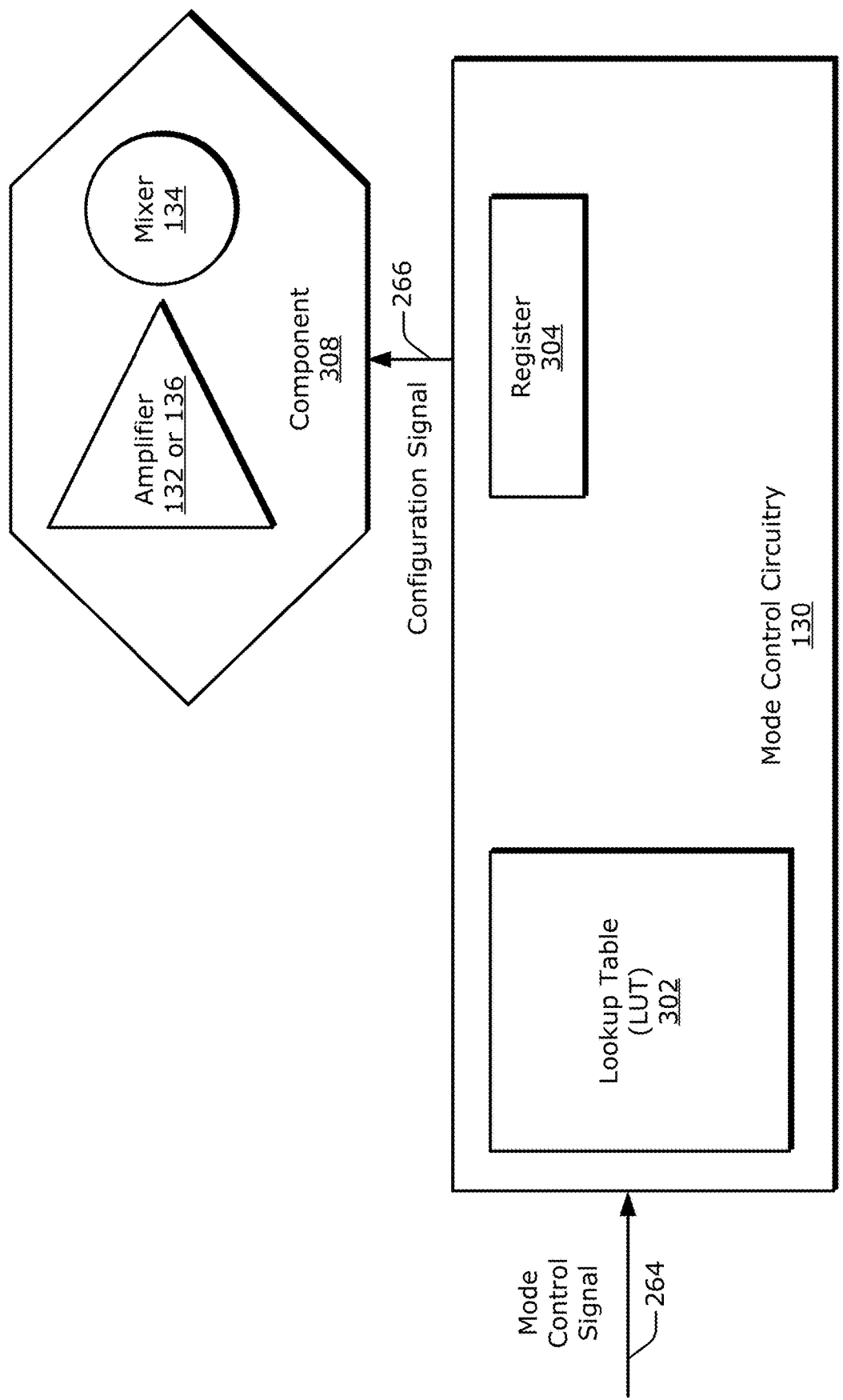
Figures 1, 3:
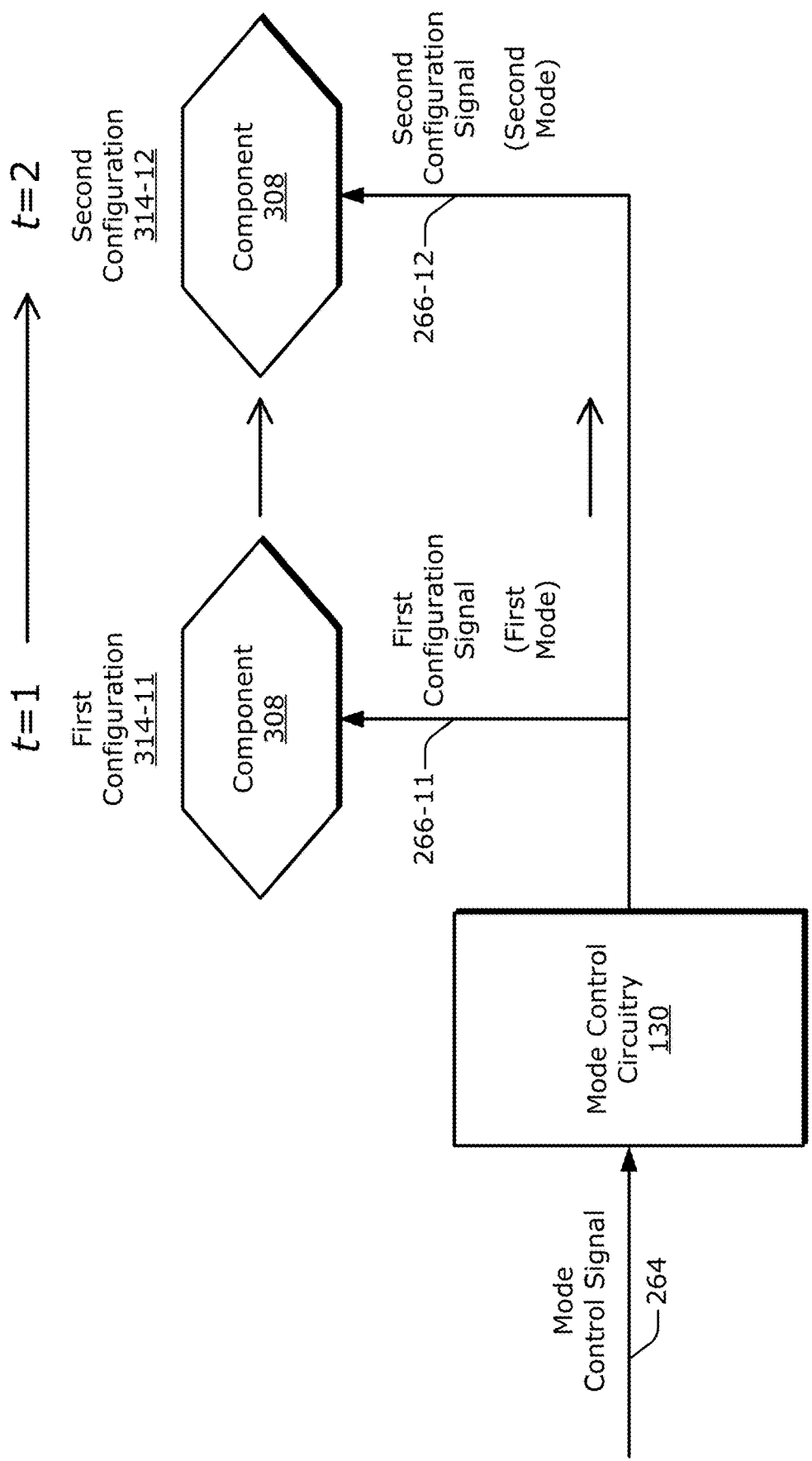
Figures 2, 3:
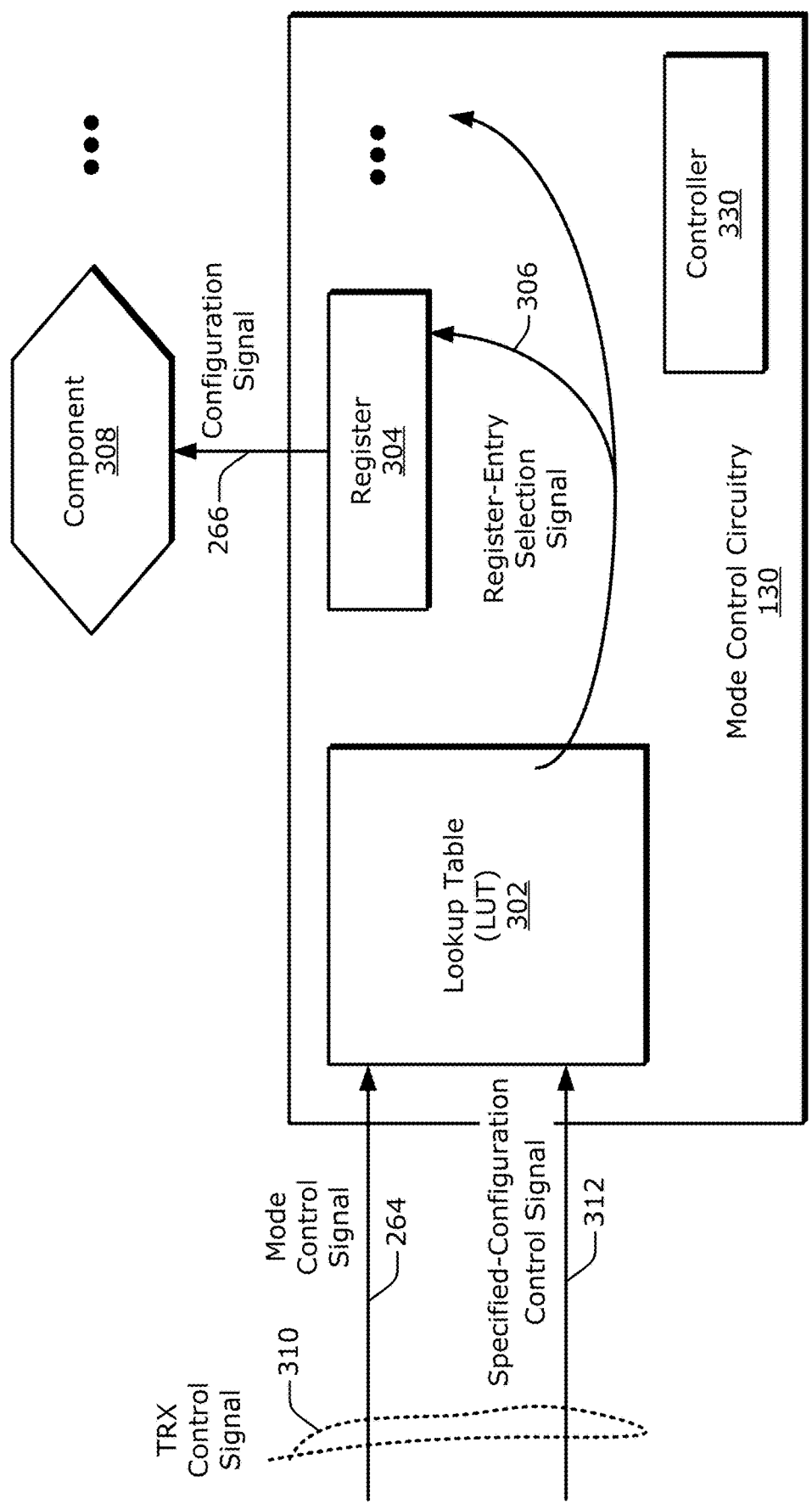
Figure 3:
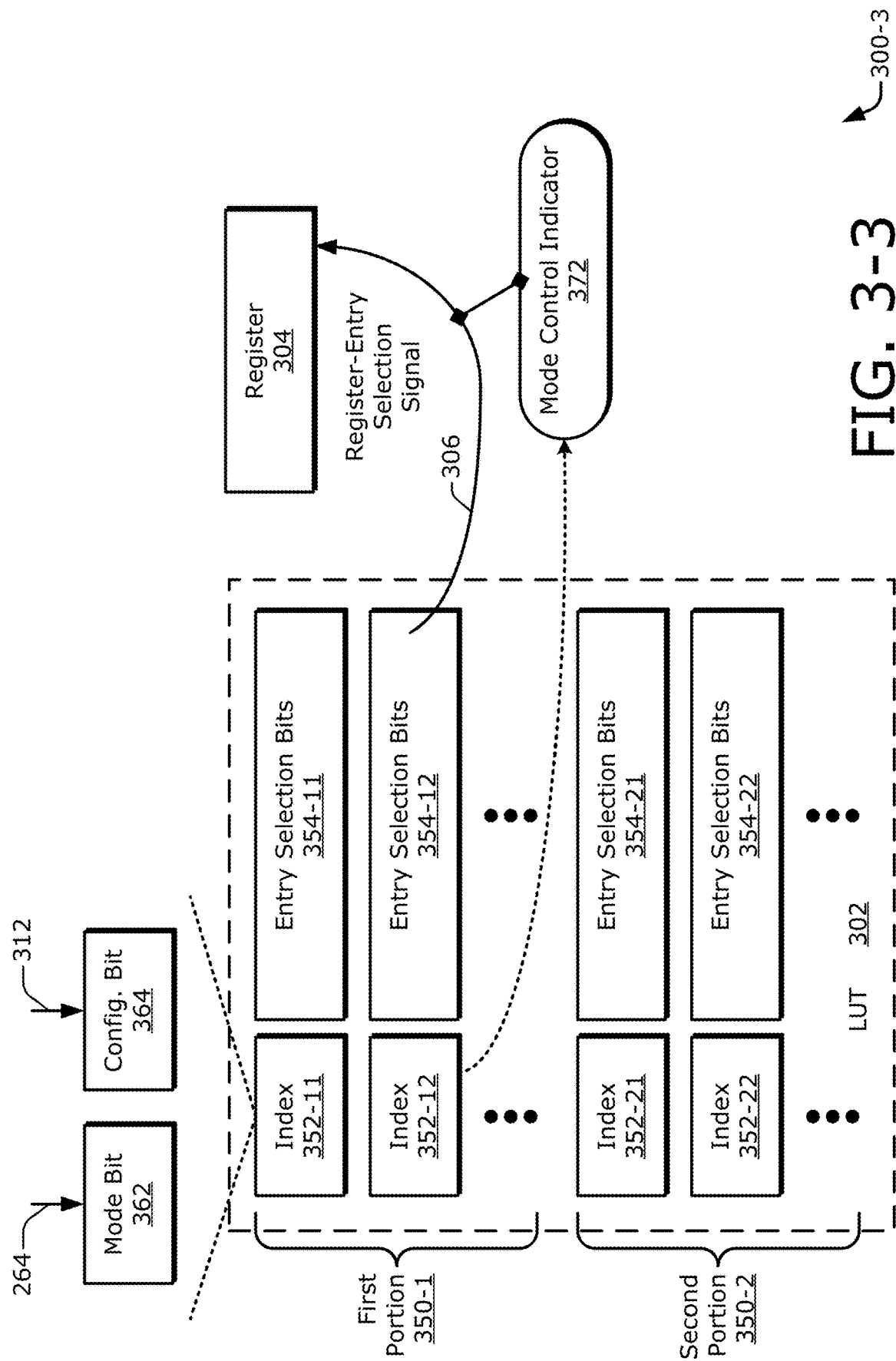
Figures 3, 4:
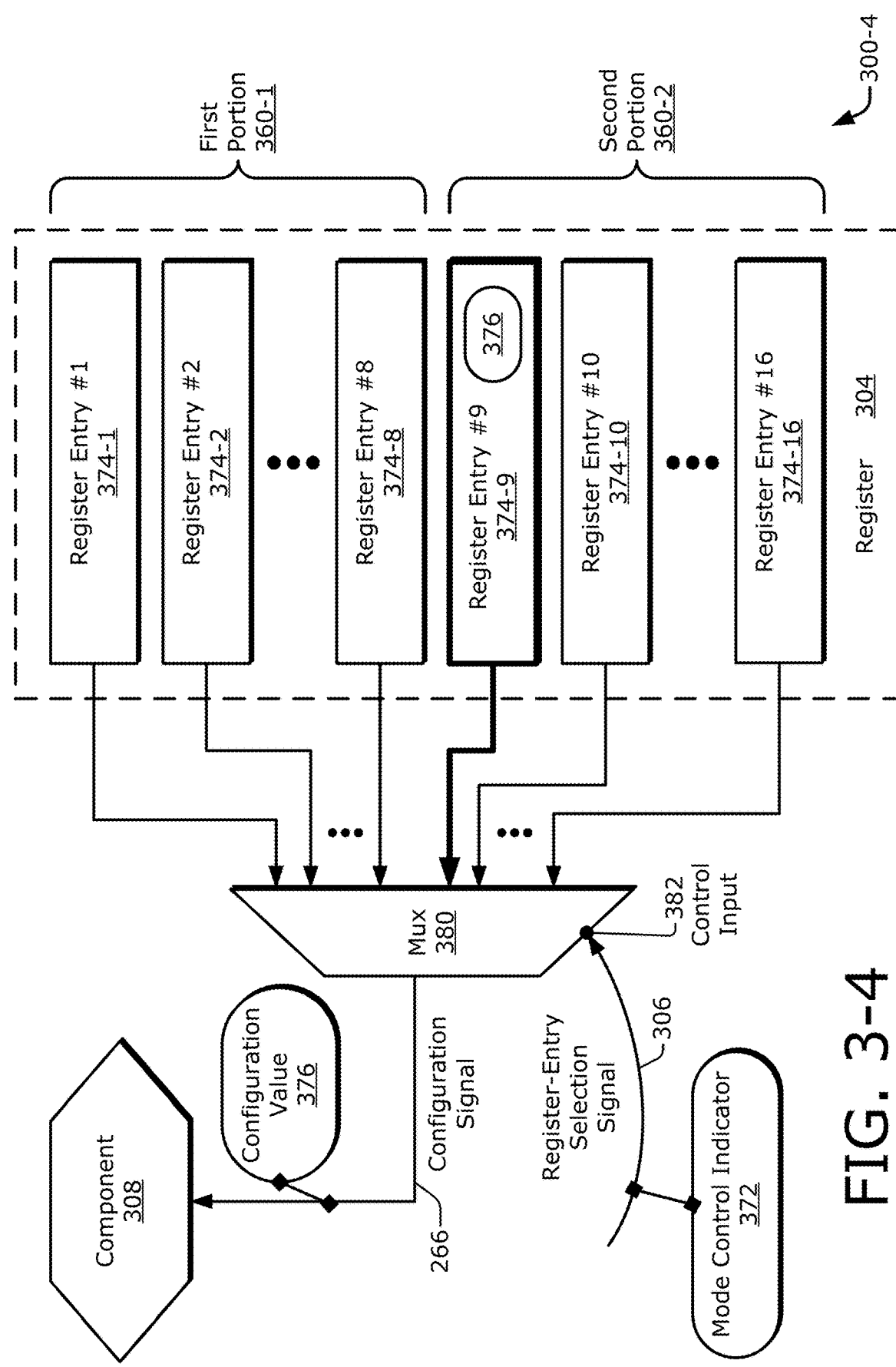
Figures 1, 4:
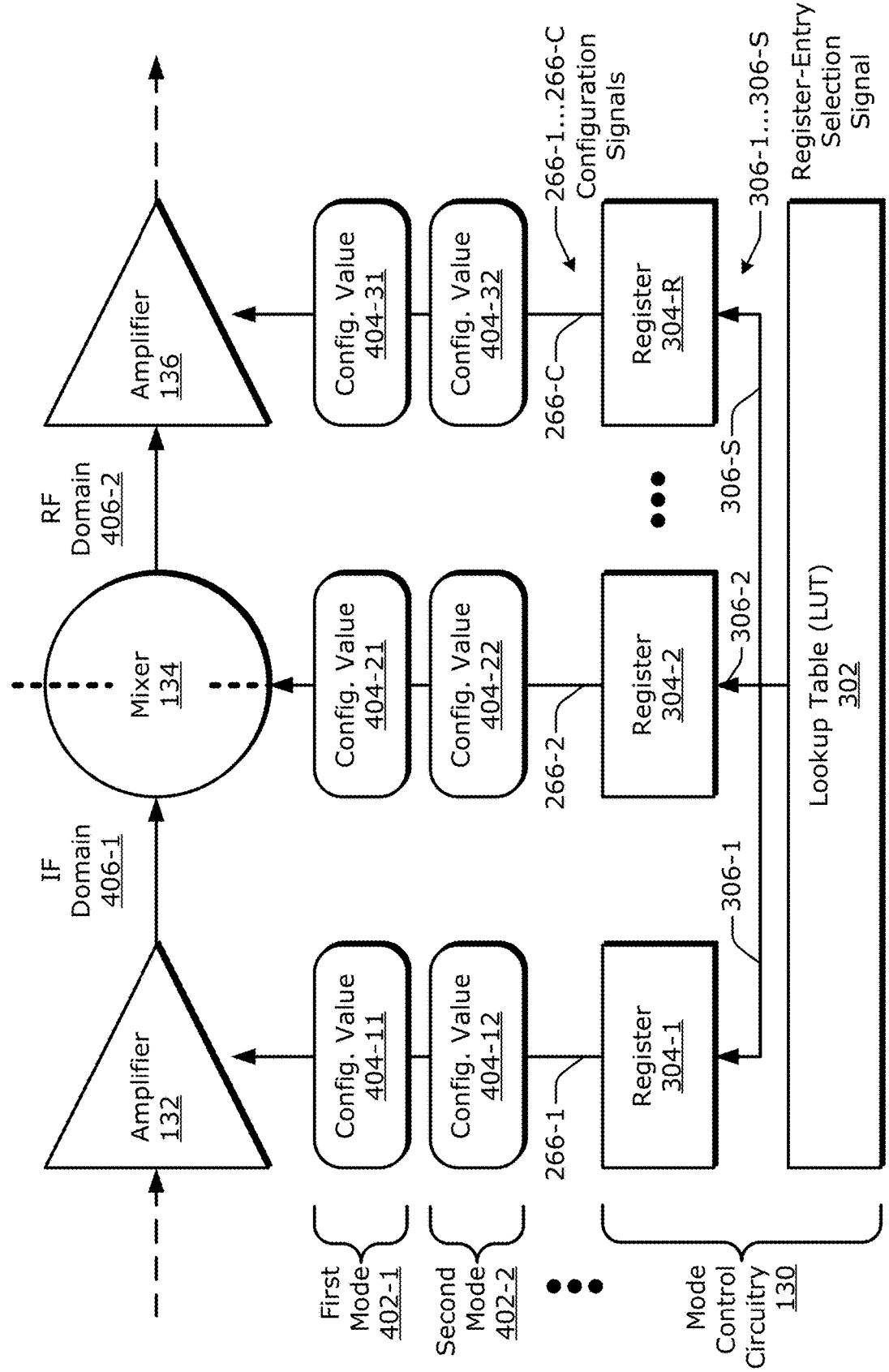
Figures 2, 4:
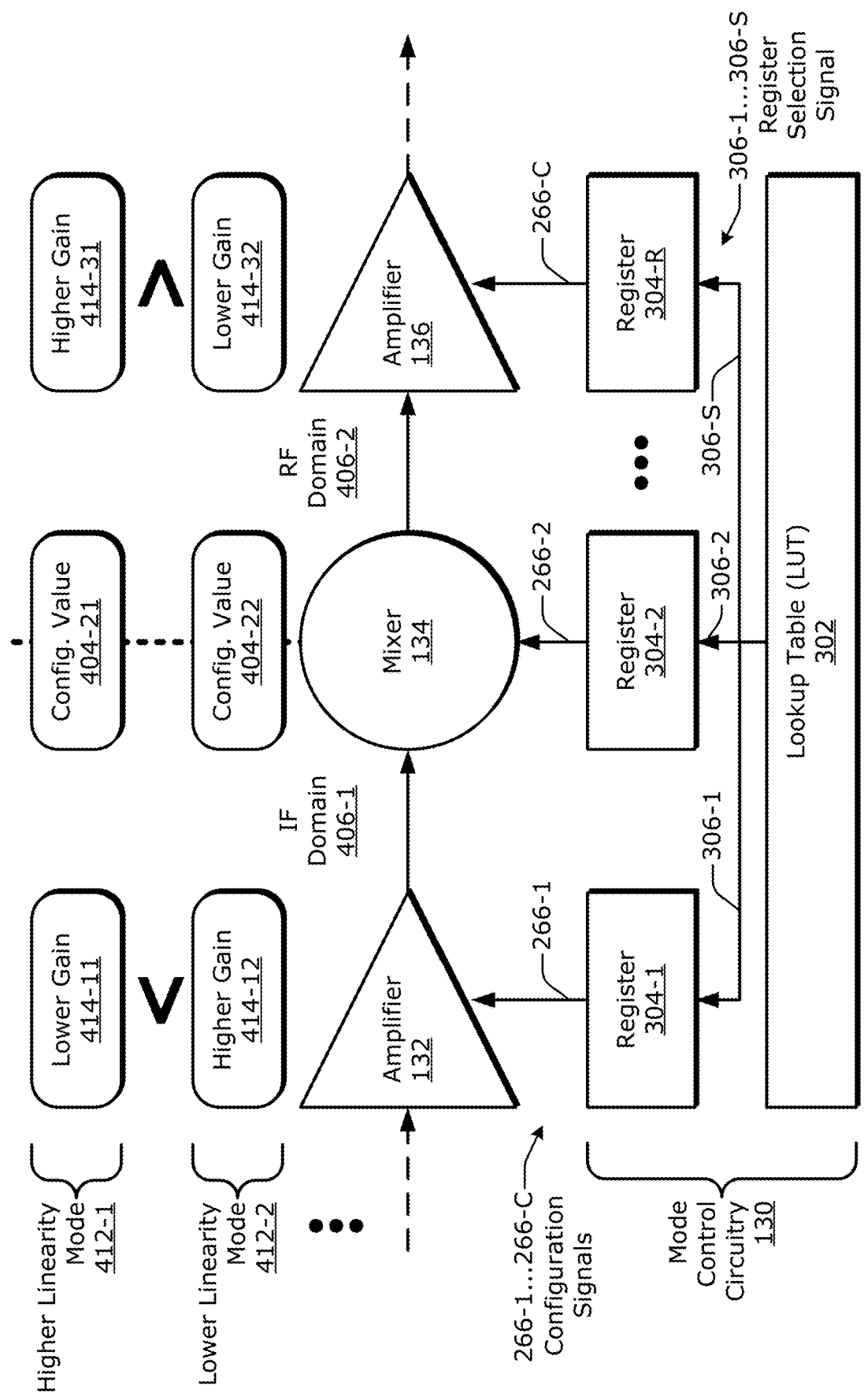
Figures 3, 4:
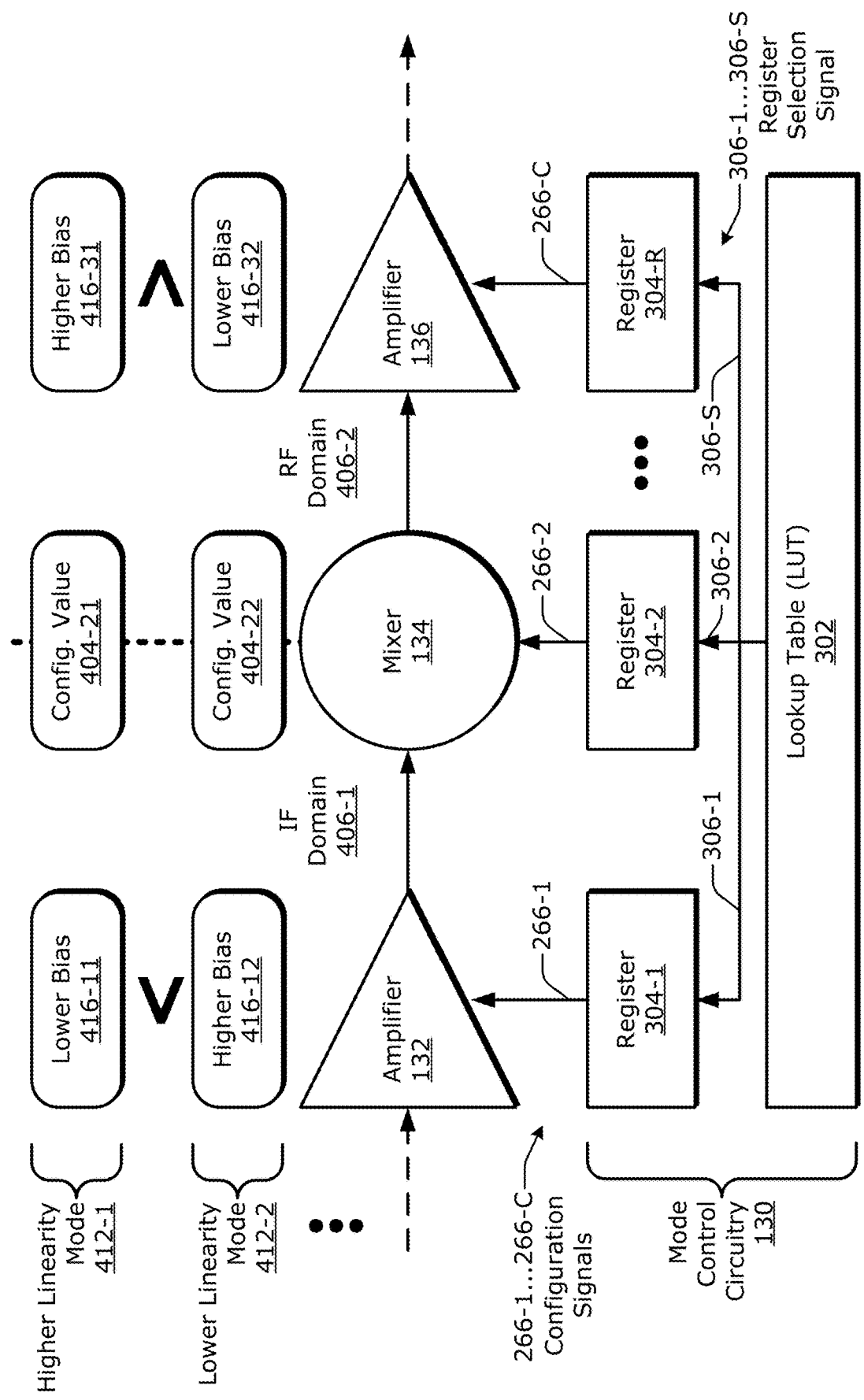

FIGS. 3 and 3-1 to 3-4 illustrate example architectures to implement mode control circuitry 130 to place a receiving component into different configurations for respective ones of different modes. More specifically, the FIGS. 3, 3-1, and 3-2 illustrate example architectures to implement mode control circuitry 130 to place a component 308 into different configurations for respective ones of different modes. Here, the example architectures for the mode control circuitry 130 include at least one lookup table 302 (LUT 302) and one or more registers 304. As shown in FIG. 3 for example implementations 300, the mode control circuitry 130 accepts at least one mode control signal 264 as input and produces at least one configuration signal 266 as output. The mode control circuitry 130 provides the configuration signal 266 to at least one component 308.

The component 308 can be realized with, for example, any component along a receive chain 202 or a transmit chain 252 (both of FIG. 2), a component of an RF front-end 128 (e.g., of FIG. 2), some combination thereof, and so forth. As depicted in FIG. 3, the at least one component can include an amplifier 132, a mixer 134, an amplifier 136, and so forth. Examples of such components are described above with reference to FIG. 2. The register 304 may be forward-deployed in proximity to the respective component(s) 308 to which it is associated. The lookup table 302 may be positioned elsewhere as part of a wireless interface device 120, such as at the transceiver 126, including a relatively centralized location that can communicate with multiple registers 304.

FIG. 3-1 illustrates, generally at 300-1, mode control circuitry 130 and a component 308 at two different times. The component 308 is depicted at two different times (t=1 and t=2) in a configuration 314 of multiple different configurations—e.g., a first configuration 314-11 and a second configuration 314-12. Each configuration 314 can correspond to one or more operational parameters of the component 308. Example operational parameters include a bias setting, a gain setting, and so forth.

In example operations, the mode control circuitry 130 receives a mode control signal 264. The mode control signal 264 can be based on, for example, a peak-to-average power ratio (PAPR), a selected waveform, the available or assigned bandwidth, a channel, etc. for the wireless signal 220 that is to be transmitted or received. The mode control signal 264 selects between two or more modes. Based on the mode control signal 264, the mode control circuitry 130 provides a configuration signal 266 to the component 308. If the mode control signal 264 indicates a first mode at a first time t=1, the mode control circuitry 130 provides a first configuration signal 266-11 to the component 308. In response to the first configuration signal 266-11, the component 308 establishes the first configuration 314-11 for operation at time t=1. Later, if the mode control signal 264 indicates a second mode at a second time t=2, the mode control circuitry 130 provides a second configuration signal 266-12 to the component 308. In response to the second configuration signal 266-12, the component 308 establishes the second configuration 314-2 for operation at time t=2.

FIG. 3-2 illustrates, generally at 300-2, mode control circuitry 130 that includes the at least one lookup table 302 (LUT 302) and the one or more registers 304. The mode control circuitry 130 can also include a controller 330 that performs, enacts, manages, or otherwise implements the functionality described herein for the mode control circuitry 130. For example, the controller 330 can cause the lookup table 302 to provide a mapping between the mode control signal 264 and the configuration signal 266 via at least one register 304. One or more specified bits from the lookup table 302 can be physically assigned as the mode control bits.

Figure 5:
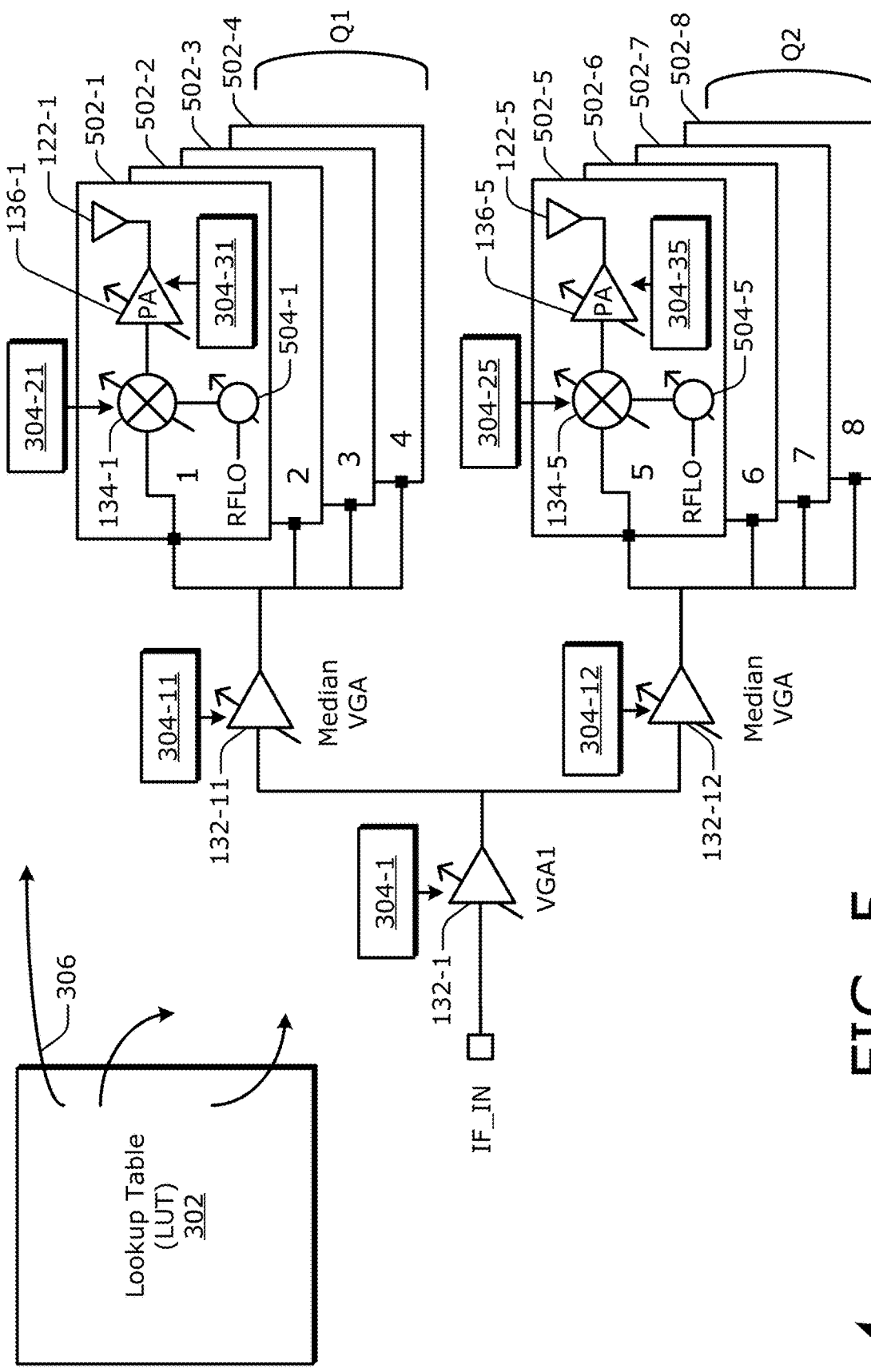
FIG. 5 illustrates two antenna arrays that depict an example fanout to four antenna elements for each antenna array, with certain transceiving components being coupled to at least one register.
Figure 6:
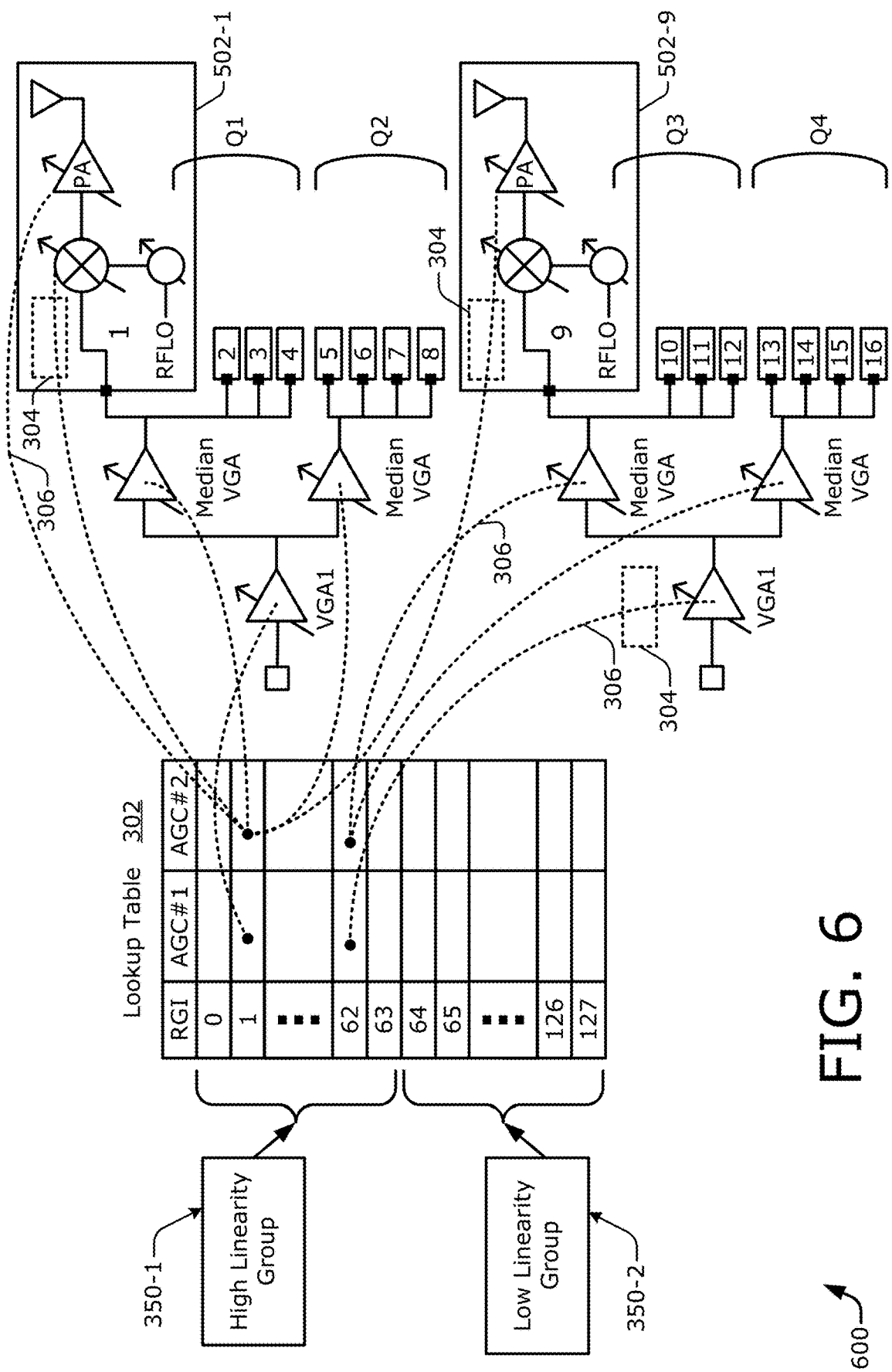
FIG. 6 illustrates four antenna arrays that depict another example fanout to four antenna elements for each antenna array, with a lookup table having mappings to certain transceiving components.
Figure 7:
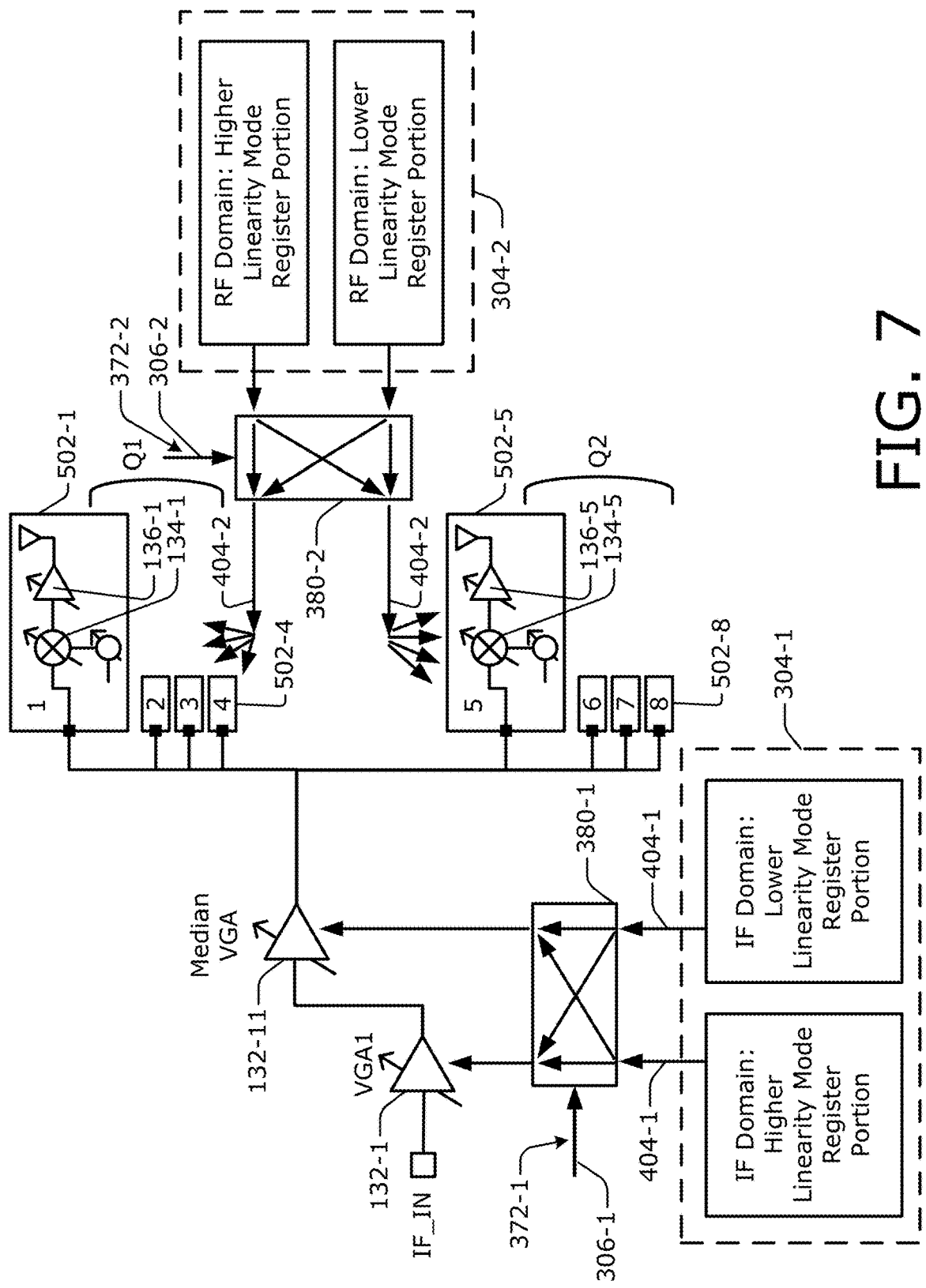
FIG. 7 illustrates an example schematic diagram including multiple components and associated registers that enable forward-deployed registers to facilitate transceiver mode changes.

In example implementations, a transceiver control signal 310 (TRX control signal 310) includes the mode control signal 264 and a specified-configuration control signal 312. The communication processor 124 (e.g., of FIGS. 1 and 2) can provide the transceiver control signal 310. Alternatively, logic of the transceiver 126 can provide at least part of the transceiver control signal 310. The specified-configuration control signal 312 selects between two or more different specified configurations responsive to a targeted PAPR, a transmit power based on a determined link budget to a receiving entity, an intended bit rate, a modulation waveform, and so forth. The lookup table 302 and the multiple registers 304 can be co-located or may be distributed over a transceiver 126 or a wireless interface device 120 in various manners, such as is shown in FIGS. 5-7, which are described below.

In example operations, the transceiver control signal 310 is applied to the lookup table 302. Based on the mode control signal 264 and the specified-configuration control signal 312 of the transceiver control signal 310, the lookup table 302 provides at least one register-entry selection signal 306. The at least one register-entry selection signal 306 is provided to each register 304. Each register 304 may receive a different register-entry selection signal 306, or at least some registers 304 may receive a same register-entry selection signal 306. The register-entry selection signal 306 selects between two or more register entries in the register 304. Examples of register entries are shown in FIG. 3-4. Each register entry in the register 304 can include a different configuration value, which is described further below with reference to FIG. 3-4. The register 304 provides the selected configuration value to the component 308 via the configuration signal 266.

FIG. 3-3 illustrates, generally at 300-3, the lookup table 302 including multiple entries, with each entry including an index portion 352 and an entry-selection portion 354. Each respective index 352-XY corresponds to respective entry selection bits 354-XY, with X and Y taking a positive integer. Thus, an index 352-11 corresponds to entry selection bits 354-11, and an index 352-12 corresponds to entry selection bits 354-12. Similarly, an index 352-21 corresponds to entry selection bits 354-21, and an index 352-22 corresponds to entry selection bits 354-22. Each of the entry selection bits 354-XY can be provided to at least one register 304 via the register-entry selection signal 306.

In example implementations, the index portion 352 includes at least one mode bit 362 and at least one configuration bit 364. These index bits jointly enable the lookup table 302 to be accessed based on a transceiver control signal 310 (e.g., of FIG. 3-2) to locate multiple entry selection bits 354-XY that correspond to the selected index bits. Specifically, the mode bit 362 can be matched or indexed based on the mode control signal 264. The configuration bit 364 can be matched or indexed based on the specified-configuration control signal 312. A quantity of bits for the at least one mode bit 362 is based on how many modes are to be implemented (e.g., one bit for up to two modes, two bits for up to four modes, and three bits for up to eight modes). A quantity of bits for the at least one configuration bit 364 is based on how many specified configurations are to be implemented (e.g., three bits for up to eight specified configurations and six bits for up to 64 specified configurations). In some aspects, the indexes 352-11, 352-12, . . . and 352-21, 352-22, . . . can provide means for indexing into the lookup table 302 to map to stored entry selection bits 354 responsive to a mode control signal 264.

The lookup table 302 is logically separated into multiple portions 350-1 . . . 350-2 that respectively correspond to multiple modes of the transceiver 126 (e.g., of FIGS. 1 and 2). Each portion 350 includes multiple entries. If the transceiver 126, or the wireless interface device 120 generally, implements two modes, for instance, the lookup table 302 can be logically separated into two portions: a first portion 350-1 and a second portion 350-2. If a transceiver 126 implements four modes, for instance, the lookup table 302 can be logically separated into four portions by also including a third portion and a fourth portion (not shown). Each respective portion 350 therefore corresponds to a respective mode. In some cases, each portion 350 includes a same quantity of entries. Example modes are described below with reference to FIGS. 4-1 to 4-3.

Each portion 350 can include a same quantity of entries (e.g., "rows" as depicted) or quantity of entry selection bits 354-XY as other portions. For instance, if 64 different specified configurations are implemented, each portion 350 can include 64 indexes 352-XY (or indices 352-XY) and 64 entry selection bits 354-XY, where X denotes the portion number and Y connotes the number of the entry selection bits. Here, the first portion 350-1 includes indexes 352-11, 352-12, . . . , 352-1Y (as represented by the vertical ellipsis, but not explicitly shown), where Y is 64 in this example. The first portion 350-1 also includes entry selection bits 354-11, 354-12, . . . , 354-1Y (as represented by the vertical ellipsis, but not explicitly shown), where Y is 64. Similarly, the second portion 350-2 includes indexes 352-21, 352-22, . . . , 352-2Y, where Y is 64. The second portion 350-2 also includes entry selection bits 354-21, 354-22, . . . , 354-2Y, where Y is 64. For some implementations, the lookup table 302 can provide example means for storing multiple entry selection bits 354-11, 354-12, . . . in a first portion 350-1 and multiple entry selection bits 354-21, 354-22, . . . in a second portion 350-2.

The mode bit 362 selects between the first portion 350-1 and the second portion 350-2 based on the mode control signal 264. Thus, writing to the at least one mode bit 362 differentiates between at least the first portion 350-1 and the second portion 350-2 of the lookup table 302 responsive to the mode control signal 264. By including both portions 350 in the lookup table 302, or by loading both portions 350 in the lookup table 302 during initialization, the transceiver 126 can more quickly switch between two modes as compared to downloading a set of entry selection bits before each mode switch during real-time operation. Thus, as little as a single write of at least one bit in a mode-dependent lookup table to change an index value thereof can automatically switch, for example, RF and IF gain control and electrical operational control, including bias currents or supply voltage values. This lookup table scheme enables modes to be switched even within the shorter latencies of 5G and other newer wireless standards that operate at higher frequencies.

Thus, the at least one mode bit 362 selects between the multiple portions (e.g., the first portion 350-1 or the second portion 350-2) based on the mode control signal 264. Within the selected portion 350, the at least one configuration bit 364 identifies entry selection bits between Y different entry selection bits 354-11, 354-12, . . . , 354-1Y in the first portion 350-1 or entry selection bits 354-21, 354-22, . . . , 354-2Y in the second portion 350-2. The identified entry selection bits 354-XY are provided to at least one register 304. As shown in FIG. 3-3, the entry selection bits 354-12 can be routed to the register 304 as part of the register-entry selection signal 306. The register-entry selection signal 306 additionally or alternatively can include the mode-bit-selected bits from the index 352 as a mode control indicator 372. The at least one bit of the mode control indicator 372 selects between two or more sets of configuration values at the register 304 for the selected mode. The mode control indicator or mode selection indication may alternatively be included in the multiple entry selection bits 354. Operation of the register 304 is described with reference to FIG. 3-4.

FIG. 3-4 illustrates, generally at 300-4, an example of a register 304 with multiple register entries 374. As shown, the register 304 includes multiple register entries 374 that are separated into multiple portions in accordance with a quantity of modes implemented by the transceiver 126. Here, the register 304 is separated into a first portion 360-1 and a second portion 360-2. In this example, each portion 360 includes eight register entries: a first register entry 374-1, a second register entry 374-2, . . . , an eighth register entry 374-8 in the first portion 360-1 and a ninth register entry 374-9, a tenth register entry 374-10, . . . , a sixteenth register entry 374-16 in the second portion 360-2. However, each portion 360 of the register 304 may include a different quantity of register entries 374. Although depicted as one register with two portions, the register 304 may alternatively be realized as two registers, each of which implements a respective portion 360.

In example implementations, each register entry 374 stores or holds at least one configuration value 376. An example configuration value 376 is depicted relative to the register entry 374-9. Hence, in some implementations, at least one register 304 can provide example means for holding multiple register entries 374-1 . . . 374-16, with each respective register entry 374 of the multiple register entries having a respective configuration value 376 for at least one setting. The register-entry selection signal 306 is provided to the register 304 by the mode control circuitry 130, as shown in FIGS. 3-2 and 3-3. In response to the mode control indicator 372 (having at least one bit that is based on the selected index 352) of the register-entry selection signal 306, a portion (e.g., the first portion 360-1 or the second portion 360-2) of the register 304 is selected. In response to the entry selection bits 354 of the register-entry selection signal 306, the configuration value 376 that is held in the corresponding register entry 374 of the selected portion (e.g., the second portion 360-2 in this example) is provided as the configuration signal 266 to the component 308.

As shown in FIG. 3-4, the configuration value(s) 376 of the selected register entry 374-9 are routed to the component 308 as the configuration signal 266 via at least one multiplexer 380 (MUX 380). Thus, the register-entry selection signal 306 can be coupled to at least one control input 382 of the multiplexer 380 to select the configuration value 376 of the corresponding register entry 374. In some aspects, the multiplexer 380 can provide example means for selecting a register entry 374 of multiple register entries 374-1 . . . 374-16. The register 304 therefore provides the at least one configuration value 376 from the selected register entry 374-9 as the configuration signal 266 to the corresponding component 308 in this example. Application of the configuration signal 266 to the component 308 is described with reference to FIG. 4-1.

FIGS. 4-1 to 4-3 illustrate example schemes to operate components in multiple different modes, including those that institute inverted bias or gain settings between two or more modes to increase efficiency while meeting signaling specifications. FIG. 4-1 illustrates, generally at 400-1, three components that can be operated in multiple different modes 402 using mode control circuitry 130 and various configuration values 404. The configuration values 376 of FIG. 3-4 can correspond to the configuration values 404 of FIGS. 4-1 to 4-3. As shown in FIG. 4-1, the three components 308 (of FIGS. 3 and 3-1 to 3-4) include an amplifier 132, a mixer 134, and another amplifier 136. These three components can be coupled together in series as part of a transmit chain in some implementations or as part of a receive chain in other implementations. Although three components are explicitly depicted in FIGS. 4-1 to 4-3 and described herein by way of example, other implementations may have more or fewer components (e.g., one or more components).

In example implementations, the mixer 134 includes at least one input node and at least one output node. An output node of the amplifier 132 is coupled to the at least one input node of the mixer 134. An input node of the amplifier 136 is coupled to the at least one output node of the mixer 134. Here, the mixer 134 separates the chain into different frequency domains: a first frequency domain 406-1 and a second frequency domain 406-2. In the illustrated example, these two frequency domains respectively correspond to an intermediate-frequency domain 406-1 (IF domain 406-1) and a radio-frequency domain 406-2 (RF domain 406-2). "Before" the mixer 134 operates on a signal propagating along a signal flow direction (e.g., on the left of the mixer 134), signal frequencies are at IF. These IF components, such as the amplifier 132, therefore operate in the IF domain 406-1. "After" the mixer 134 operates on the signal propagating along the signal flow direction (e.g., on the right of the mixer 134), signal frequencies are at RF. These RF components, such as the amplifier 136, therefore operate in the RF domain 406-2. In a transmit chain implementation, for instance, the amplifier 132 can be realized as a driver amplifier, a variable-gain amplifier (VGA), and so forth. The amplifier 136 can be realized as power amplifier, a VGA, and so forth. Generally, a mixer can separate, define, create, or be part of any frequency domain—e.g., IF, RF, or baseband (BB) frequency. Further, for purposes of modal configuration, the mixer 134 can be assigned with the amplifier 136 in the RF domain or paired with the other amplifier 132 in the IF domain, or the mixer 134 can be separate from both.

In example implementations, the lookup table 302 provides multiple register-entry selection signals 306-1, 306-2, . . . , 306-S, with "S" representing a positive integer. Depending on implementation, each given register-entry selection signal 306 may be unique or may have a value or signal line that is shared between two or more registers 304. Each respective component can include or can be associated with a respective register 304. Alternatively, a register may be shared such that the shared register has configuration values to configure two or more components. FIG. 4-1 illustrates registers 304-1, 304-2, . . . , 304-R, with "R" representing a positive integer. In some cases, the variables "R" and "S" may be equal. As shown, a first amplifier 132 is associated with a first register 304-1, and a second amplifier 136 is associated with a second register 304-R. The mixer 134 is associated with a third register 304-2.

Each respective register 304 of the multiple registers 304-1 . . . 304-R outputs a respective configuration signal 266 of the multiple configuration signals 266-1 . . . 266-C. Each register 304 stores at least one configuration value 404 at each register entry 374 (e.g., illustrated as a configuration value 376 in FIG. 3-4). Based on the corresponding register-entry selection signal 306, the register 304 outputs a configuration signal 266 including the configuration value 404 held in the indicated register entry 374. The respective configuration signal 266 is provided to the at least one component that is coupled to the corresponding register 304. For example, the configuration value 404 can be used to establish a bias or a gain, or both, of the associated component.

As shown, the first register 304-1 can hold at least one first configuration value 404-1x that establishes at least one operational parameter of the first amplifier 132. Similarly, the second register 304-R can hold at least one second configuration value 404-3x that establishes at least one operational parameter of the second amplifier 136. Further, the third register 304-2 can hold at least one third configuration value 404-2x that establishes at least one operational parameter of the mixer 134. These operational parameters can correspond to, for example, a bias setting or a gain setting that is established based on a mode 402. Thus, in some described implementations, the first register 304-1 and the second register 304-R can provide example means for establishing a first setting for the first amplifier 132 and a second setting for the second amplifier 136 based on a mode 402 of a transceiver.

The transceiver operates in multiple modes 402. In this example, the transceiver operates in at least two modes: a first mode 402-1 and a second mode 402-2. The transceiver can, however, operate in more than two modes, providing a third mode, a fourth mode, and so forth. In some cases, the first mode 402-1 corresponds to the first portion 350-1 of the lookup table 302 and the first portion 360-1 of each register 304. Similarly, the second mode 402-2 corresponds to the second portion 350-2 of the lookup table 302 and the second portion 360-2 of each register 304 (of FIGS. 3 and 3-1 to 3-4). Thus, the registers 304-1, 304-2, . . . , 304-R can store at least one configuration value 404-WZ for each mode 402, where W represents the corresponding register and Z represents the corresponding mode. For the first mode 402-1, the registers 304-1, 304-2, . . . , 304-R respectively store configuration values 404-11, 404-21, . . . 404-31, where "R" equals three in this example. For the second mode 402-2, the registers 304-1, 304-2, . . . , 304-R respectively store configuration values 404-12, 404-22, . . . 404-32.

In example operations, if the mode control signal 264 (e.g., of FIGS. 2, 3, and 3-1 to 3-4) indicates the first mode 402-1, the amplifier 132 is configured using the configuration value 404-11 based on operation of the mode control circuitry 130. Further, in this first mode 402-1, the mixer 134 is configured using the configuration value 404-21, and the amplifier 136 is configured using the configuration value 404-31. If the communication processor 124 changes the mode control signal 264, which is indexed into the lookup table 302, the mode control circuitry 130 can switch modes without a change to the selection bits in the lookup table 302, so the mode switch can be performed sufficiently quickly to meet the latency demands of, for instance, 5G-capable devices. For example, control circuitry can write as few as one bit into the index 352 portion of the lookup table 302 to switch modes. Thus, if the mode control signal 264 indicates the second mode 402-2, the amplifier 132 is configured using the configuration value 404-12 based on operation of the mode control circuitry 130. Further, in this second mode 402-2, the mixer 134 is configured using the configuration value 404-22, and the amplifier 136 is configured using the configuration value 404-32. In these manners, for certain aspects, a lookup table 302 can provide example means for adjusting the first setting inversely compared to the second setting responsive to a switch between two modes 402 of the transceiver. Gain settings 414 and bias settings 416 that can be inversely adjusted are described further below with reference to FIG. 4-2 and FIG. 4-3, respectively.

The multiple modes can correspond to different operational parameters. In some implementations, each mode of at least a portion of the multiple modes can correspond to a different operational linearity. For example, the first mode 402-1 can correspond to a relatively higher operational linearity, and the second mode 402-2 can correspond to a relatively lower operational linearity. Although the second mode 402-2 with the lower linearity may introduce greater distortion during operation, the lower linearity may enable a higher level of efficiency—e.g., the lower linearity mode may be configured to draw less power than the higher linearity mode.

Examples of relative configuration values 404 between two different modes are described with reference to FIGS. 4-2 and 4-3. FIG. 4-2 is directed to configuring a gain setting of one or more components. With a two mode example, the mode control circuitry 130 can establish a first gain setting or a second gain setting—e.g., a lower gain or a higher gain for each transceiving component. FIG. 4-3 is directed to configuring a bias setting of one or more components. With the two mode example, the mode control circuitry 130 can establish a first bias setting or a second bias setting—e.g., a lower bias or a higher bias for each transceiving component. Although not explicitly shown in FIG. 4-2 or 4-3, the configuration values 404-21 and 404-22 of the mixer 134 may also be adjusted based on switching between the linearity modes 412-1 and 412-2.

FIG. 4-2 illustrates, generally at 400-2, three components that can be operated in multiple different modes 412 using mode control circuitry 130. In FIG. 4-2, the configuration values 404 are implemented as gain values 414. In example implementations, for a higher linearity mode 412-1, the relatively higher gain along the, e.g., transmit chain is allocated to the amplifier 136. For a lower linearity mode 412-2, on the other hand, the relatively higher gain is allocated along the transmit chain to the amplifier 132. In other words, the higher versus lower gain allocations are flipped or inverted in the two frequency domains between the higher and lower linearity modes 412-1 and 412-2. With both linearity modes 412-1 and 412-2, a total gain and corresponding gain step between each index of the lookup table along the transmit chain, or the transmit chain gain line-up, may be substantially equivalent to meet a targeted link budget for transmitting the wireless signal in either mode. An analogous inverted gain lineup between two modes can be implemented for a receive chain. Further, in some implementations, an overall link budget, including a total gain lineup and gain steps, can be set to be substantially constant, regardless of the selected linearity mode or how many linearity modes are available.

In some implementations, in the higher linearity mode 412-1, the amplifier 132 is configured with a lower gain 414-11, and the amplifier 136 is configured with a higher gain 414-31. In contrast, in the lower linearity mode 412-2, the amplifier 132 is configured with a higher gain 414-12, and the amplifier 136 is configured with a lower gain 414-32. In this context, the amplifier 132 is configured with a relatively lower gain 414-11 in the higher linearity mode 412-1 and with a relatively higher gain 414-12 in the lower linearity mode 412-2 (e.g., the gain 414-11 is relatively lower than the gain 414-12, thereby comparing different gains of a same amplifier 132 at different times for different modes). An inverted gain situation is applied to the amplifier 136. The amplifier 136 is configured with a relatively higher gain 414-31 in the higher linearity mode 412-1 and with a relatively lower gain 414-32 in the lower linearity mode 412-2 (e.g., the gain 414-31 is relatively higher than the gain 414-32, thereby comparing different gains of a same amplifier 136 at different times for different modes).

In some situations, signals with a higher frequency use more power than signals with a lower frequency. Also, power amplifiers may use more power than driver amplifiers, some VGAs, or other types of amplifiers. Consequently, shifting the higher gain allocation from the RF domain 406-2 to the IF domain 406-1 can save power usage by shifting from the first mode to the second mode, at the cost of decreased linearity in the lower linearity mode 412-2. Additionally or alternatively, power savings can be based on fan-out or fan-in architecture with an antenna array environment. In an antenna array environment, components are "multiplied" by a quantity of paths at each level of a fan-out architecture, and the quantity of paths increases as levels move "outward" toward an antenna element of an antenna array for the fan-out architecture. Thus, power savings (e.g., a lower current magnitude or a lower supply voltage level) per component can be multiplied to a greater degree for components that are farther outward along a path that is fanning out toward an antenna element. In this sense, shifting the higher gain allocation from the amplifier 136 to the amplifier 132 can save power usage, if there are more instances of the amplifier 136 than there are of the amplifier 132 in a given transceiver. However, this power savings is achieved at the cost of decreased linearity in the lower linearity mode 412-2. For some wireless environments, such as those with low data rates or a friendly propagation path, the lower linearity is acceptable because a "simpler" modulation waveform may be used (e.g., QPSK instead of 64 QAM). An example of how such a fan-out architecture can impact power usage is described further below with reference to FIG. 5.

FIG. 4-3 illustrates, generally at 400-3, three components that can be operated in multiple different modes 412 using mode control circuitry 130. In FIG. 4-3, the configuration values 404 are implemented as bias configuration values 416. In example implementations, for a higher linearity mode 412-1, the higher bias is allocated to the amplifier 136. For a lower linearity mode 412-2, on the other hand, the higher bias is allocated to the amplifier 132. In other words, the higher versus lower bias allocations are flipped or inverted for the components along the, e.g., transmit chain between the higher and lower linearity modes 412-1 and 412-2.

In some implementations, in the higher linearity mode 412-1, the amplifier 132 is configured with a lower bias 416-11, and the amplifier 136 is configured with a higher bias 416-31. In contrast, in the lower linearity mode 412-2, the amplifier 132 is configured with a higher bias 416-12, and the amplifier 136 is configured with a lower bias 416-32. In this sense, the amplifier 132 is configured with a relatively lower bias 416-11 in the higher linearity mode 412-1 and with a relatively higher bias 416-12 in the lower linearity mode 412-2 (e.g., the bias 416-11 is relatively lower than the bias 416-12, thereby comparing different biases of the same amplifier 132 at different times for different modes). An inverted bias allocation is applied to the amplifier 136 across the two or more modes. The amplifier 136 is configured with a relatively higher bias 416-31 in the higher linearity mode 412-1 and with a relatively lower bias 416-32 in the lower linearity mode 412-2 (e.g., the bias 416-31 is relatively higher than the bias 416-32, thereby comparing different biases of the same amplifier 136 at different times for different modes).

The mode control circuitry 130 can therefore adjust the first bias setting (e.g., the bias setting 416-1x of the first amplifier 132) inversely to the second bias setting (e.g., the bias setting 416-3x of the second amplifier 136) responsive to a switch between two modes. The bias setting adjustments can be made with low latency by indexing into different portions 350 (e.g., of FIG. 3-3) of the lookup table 302, with each portion corresponding to a different setting for a given transceiving component and gain lineup. The corresponding entry selection bits 354 are mapped to a selected configuration value 376 or 404 and activated using the multiplexer 380 (e.g., coupled to a transceiving component) to increase or decrease a given setting relative to a previous setting. In these manners, the mode control circuitry 130 can effect the acts described above with reference to FIG. 4-3 to provide example means for increasing a first bias setting (e.g., the lower bias 416-11) of a first amplifier 132 responsive to the switch from a first mode 402-1 (e.g., the higher linearity mode 412-1) to a second mode 402-2 (e.g., the lower linearity mode 412-2) and example means for decreasing a second bias setting (e.g., the higher bias 416-31) of a second amplifier 136 responsive to the switch from the first mode to the second mode.

The bias values can pertain to voltage or current. For example, each current bias value can establish a magnitude for a bias current, or bias current magnitude, for the corresponding component. Alternatively, each voltage bias value can establish a level for or an amount of a bias supply voltage, or supply voltage level, for the corresponding component. For instance, the bits in a selected register entry 374 of a corresponding register 304 can cause at least one switch to be opened or closed to couple the corresponding component, such as the amplifier 132, to a power supply rail of a target supply voltage level to change a voltage bias.

FIG. 5 illustrates, generally at 500, two antenna arrays Q1 and Q2 that depict an example fan-out to four antenna elements of each antenna array. In the illustrated example, each antenna element is part of a respective antenna module portion 502-1, 502-2, 502-3, 502-4, 502-5, 502-6, 502-7, and 502-8. Two antenna elements, 122-1 and 122-5, are explicitly indicated in FIG. 5 for clarity. Each of the transceiving components, such as an amplifier or a mixer, can be coupled to a register 304. By way of example only, certain registers are depicted in FIG. 5, as is described below.

In this example, the amplifier 132 is realized with up to three amplifiers, each of which is implemented as a variable-gain amplifier. An amplifier 132-1 is implemented as a VGA1; an amplifier 132-11 is implemented as a first intermediate or median VGA; and an amplifier 132-12 is implemented as a second intermediate or median VGA. The amplifier 132-1 provides a signal that is split and coupled to both amplifiers 132-11 and 132-12. The amplifier 132-11 leads to the first antenna array Q1 with the four antenna module portions 502-1 to 502-4, and the amplifier 132-12 feeds into the second antenna array Q2 with the four antenna module portions 502-5 to 502-8.

Each antenna array Q1 and Q2 includes four paths leading to a respective antenna element 122. For example, a first path "1" includes a mixer 134-1 and a power amplifier 136-1 leading to the antenna element 122-1. As depicted, a phase shifter 504-1 is realized as a phase-shifting mixer. However, a phase shifter can be implemented in an alternative manner—e.g., separately from the mixer or at a different position along the signaling path. A local oscillator (LO) is depicted as a radio-frequency local oscillator (RFLO). In such cases, an input signal to the VGA1 132-1 may have an intermediate frequency (IF). In alternative implementations, the illustrated circuitry may operate with different frequencies.

The components of the first antenna module portion 502-1 are duplicated in each of the second through eighth paths or modules "2" to "8." Thus, a power savings at the power amplifier 136-1 can have four times the effect as a power savings at the median VGAs 132-11 and 132-12 and eight times the effect of a power savings at the VGA1 132-1. Hence, although some linearity may be sacrificed, shifting a weight of a gain line up "leftward" in the illustrated circuit of FIG. 5 (e.g., by increasing a gain at the amplifier 132-1 and decreasing gains at the multiple amplifiers 136-1 to 136-8) can reduce total power usage.

FIG. 5 also depicts example physical localities for various registers 304 and the lookup table 302. As shown, the lookup table 302 can be disposed away from the antenna array circuitries Q1 and Q2, such as nearer a communication processor 124 or centrally relative to various antenna array circuitries distributed around an electronic device—e.g., as parts of the transceiver 126 or the RF front-end 128. Each register 304, in contrast, can be forward-deployed to be co-located with, or at least located nearer to, a corresponding transceiving component. For instance, a register 304-31 for the amplifier 136-1 can be located on the first antenna module portion 502-1 for the antenna array Q1, and a register 304-35 for the amplifier 136-5 can be located on the fifth antenna module portion 502-5 for the antenna array Q2.

As another example with the antenna module portions, a register 304-21 is positioned proximate and coupled to the mixer 134-1, and a register 304-25 is positioned proximate and coupled to the mixer 134-5. In the relatively lower frequency domain, the median VGA 132-11 is coupled to a register 304-11, and a median VGA 132-12 is coupled to a register 304-12. Further, a register 304-1 is coupled to, and physically proximate to, the VGA1 132-1. Antenna arrays Q1 and Q2 may be positioned, for instance, on opposite sides of a device for directional beamforming Registers 304 can also be shared. For instance, one register may provide configuration values for both median VGAs 132-11 and 132-12. Additionally or alternatively, one register may provide configuration values for the four power amplifiers 136 (PA 136) respectively of the four antenna modules portions 502-1 to 502-4.

FIG. 6 illustrates, generally at 600, four antenna arrays Q1, Q2, Q3, and Q4 that depict another example fan-out to four antenna elements at each antenna array for a total of 16 antenna elements. FIG. 6 also includes a lookup table 302 having mappings to certain transceiving components via at least one register 304. Each antenna element may be part of a respective antenna module portion, as is explicitly shown for first and ninth antenna module portions 502-1 and 502-9.

In this example, antenna arrays Q1 and Q2 may be configured for one layer, and antenna arrays Q3 and Q4 may be configured for another layer. The two layers—and their respective two antenna arrays apiece—may correspond, for instance, to a horizontal polarization and a vertical polarization.

By way of example but not limitation, the lookup table 302 includes 64 rows or automatic gain control (AGC) entries per group, or portion 350. With two groups, the lookup table 302 includes 128 entries (0, 1 . . . , 62, 63, 64, 65, . . . , 126, and 127). Each row can include different automatic gain control (AGC) settings. The two groups are designated as a high-linearity group, for a first portion 350-1, and a low-linearity group, for a second portion 350-2, with the latter having a relatively lower linearity than the former. Mappings are depicted using multiple register-entry selection signals 306 that extend from the lookup table 302 to the corresponding transceiving components, such as a VGA1, median VGA, mixer, or PA. The mappings are depicted via multiple registers 304 of corresponding transceiving components, but not all registers 304 are shown for clarity.

FIG. 7 illustrates an example schematic diagram 700 including multiple transceiving components and associated registers. This example is presented in terms of different bias values for different modes (e.g., analogously to the bias settings of FIG. 4-3). The principles, however, are also or instead applicable to instituting different gain settings (e.g., of FIG. 4-2). The forward-deployed registers 304-1 and 304-2 can facilitate transceiving mode changes with low latency. The registers 304 are at least partially grouped together by frequency domain, which are the IF and RF domains in this example. Each register 304-1 or 304-2 feeds configuration values to a component via a respective multiplexer 380-1 or 380-2 that is controlled by a respective register-entry selection signal 306-1 or 306-2. Each respective register-entry selection signal 306-1 and 306-2 includes at least one bit realizing a mode control indicator 372-1 and 372-2 (e.g., of FIGS. 3-3 and 3-4), which corresponds to or is determined responsive to a respective selected index 352 (e.g., of FIG. 3-3).

In example implementations, the registers 304-1 provide configuration values 404-1 to the transceiving components of the IF domain. The registers 304-2 provide configuration values 404-2 to the transceiving components of the RF domain. In the IF domain, the registers 304-1 can be coupled to at least the VGA1 132-1 and the median VGA 132-11 via the multiplexer 380-1. A first group or portion of the registers 304-1 provides a lower bias current setting or a lower bias voltage setting for the IF section for a higher linearity mode. For a lower linearity mode, a second group or portion of the registers 304-1 provides a relatively higher bias current setting or a relatively higher bias voltage setting for the IF section.

The transceiving components are biased with inverted settings in the RF domain relative to the IF domain between the two modes: lower linearity mode and higher linearity mode. In the RF domain, the registers 304-2 are coupled, for example, to the multiple power amplifiers 136 or the multiple mixers 134 (or both) of the multiple antenna module portions 502-1 . . . 502-4 of the antenna array Q1 and the multiple antenna module portions 502-5 . . . 502-8 of the antenna array Q2 via the multiplexer 380-2. In some aspects, the antenna array Q1 operates as a high band upconverter, and the antenna array Q2 operates as a low band upconverter. One portion or group of the registers 304-2 provides a higher bias current setting or a higher bias voltage setting for the RF section at the higher linearity mode. Another portion or group of the registers 304-2 provides a relatively lower bias current setting or a relatively lower bias voltage setting for the RF section at the lower linearity mode.

Figure 8:
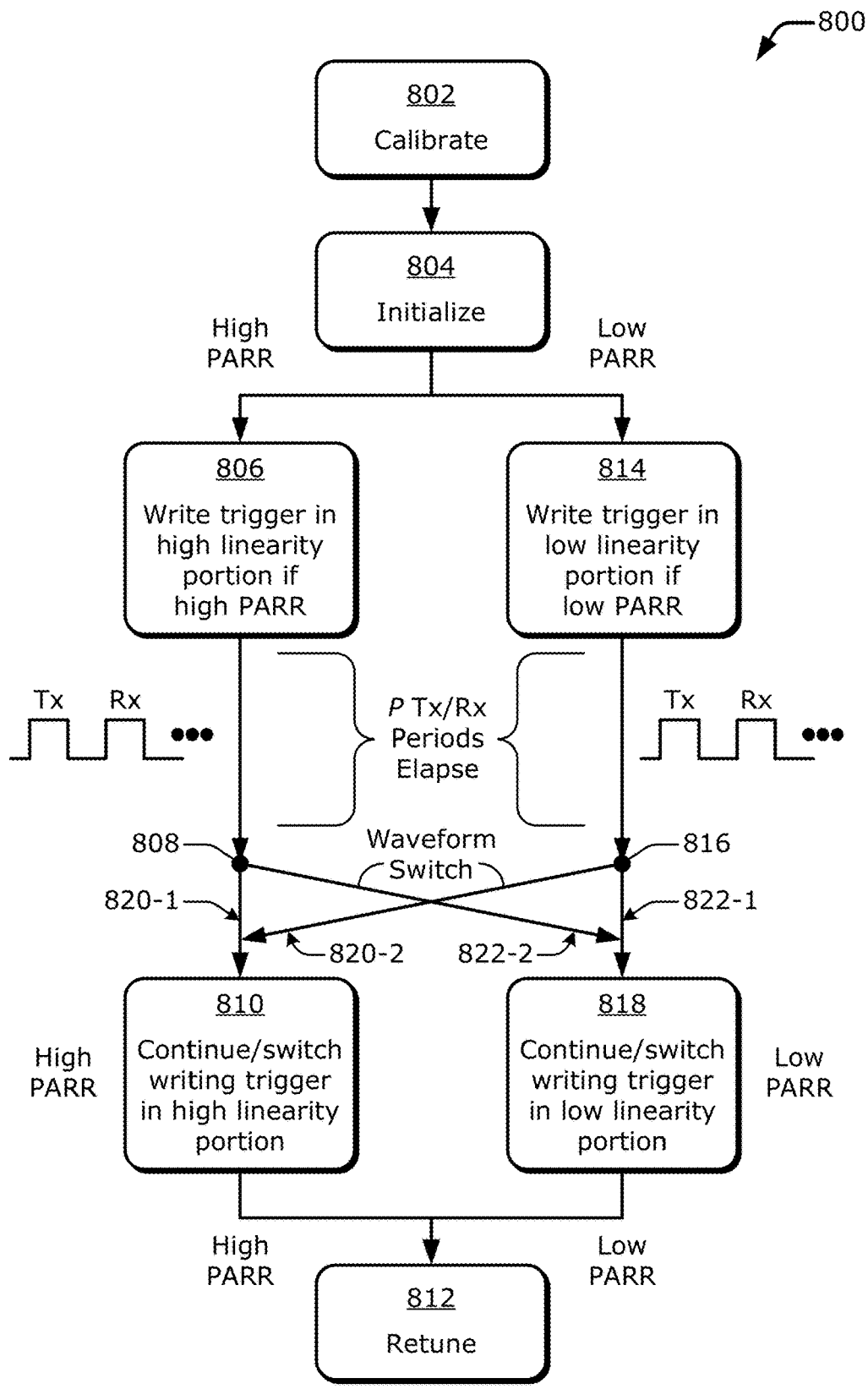
FIG. 8 illustrates a flowchart of an example process for operating a multimode transceiver.

FIG. 8 illustrates a flowchart 800 of an example process for operating a multimode transceiver with mode control using a lookup table. At 802, responsive to a power-on or reset condition, an electronic device 102 calibrates, e.g., performs a self-calibration procedure. The calibration can include establishing a higher linearity mode and a lower linearity mode for the multimode transceiver. For example, a wireless interface device 120 can separately establish configuration values for a relatively higher linearity RF gain index (RGI) and a relatively lower linearity RGI. At 804, the electronic device 102 initializes the wireless interface device 120 for a given radio access scheme. For example, the device can initialize the wireless transceiver memory by downloading data into the memory. Loaded data can include settings, templates (e.g., data for a mode-dependent lookup table, such as transmitter coarse gain AGC values for multiple modes), and so forth. As part of the initialization, the device can also tune the receive and transmit channels to attain a targeted frequency and bandwidth.

After the initialization at 804, the flowchart 800 splits into a high PARR fork on the left of the diagram and a low PARR fork on the right of the diagram. Responsive to a wireless communication signal with a waveform having a high PARR, at 806 a trigger is written for a higher linearity mode for at least one specified configuration (e.g., at least one particular bit value can be written at an index 352 for a first portion 350-1 of a lookup table 302 of FIG. 3-3). In operation, the corresponding configuration values are applied to the transceiving components of a transmit chain 252 (of FIG. 2) for the higher linearity mode (e.g., of FIGS. 4-2 and 4-3). After a number P of transmit (Tx) or receive (Rx) periods, the current waveform is checked at a decision point 808. If the waveform continues to have a high PARR, as indicated by path 820-1, then at 810 the configuration values for the higher linearity mode continue to be used, and the high linearity trigger continues to be written in the lookup table. At the end of the transmit/receive phase or the start of another such phase, the device can retune for a different band or channel, as appropriate, at 812. If the waveform ceases to have a high PARR at the decision point 808, then the flowchart 800 switches to the low PARR fork as indicated by a path 822-2. The low PARR fork is described next.

After initialization at 804 or during the transmit/receive phase at a decision point, a wireless communication signal may instead have a waveform with a low PARR. If the waveform initially has a low PARR, then at 814 a trigger is written for a lower linearity mode for at least one specified configuration (e.g., at least one particular bit value can be written at an index 352 for a second portion 350-2 of the lookup table 302 of FIG. 3-3). The corresponding configuration values are applied to the transceiving components of the transmit chain 252 (of FIG. 2) for the lower linearity mode (e.g., of FIGS. 4-2 and 4-3). After a number P of transmit (Tx) or receive (Rx) periods, the current waveform is checked at a decision point 816. If the waveform continues to have a low PARR, as indicated by a path 822-1, then at 818 the configuration values for the lower linearity mode continue to be used, and the low linearity trigger continues to be written in the lookup table. At the end of the transmit/ receive phase or the start of another such phase, the device can retune for a different band or channel, as appropriate, at 812. If the waveform ceases to have a low PARR at the decision point 816, then the flowchart 800 switches to the high PARR fork as indicated by a path 820-2.

Thus, the operational linearity mode can switch from high to low mode, or vice versa, at one or the other of the decision points. At the decision point 808, if the waveform switches from high PARR to low PARR, then the process moves along the path 822-2 to 818, and the trigger switches to the low linearity portion of the lookup table. At the decision point 816, if the waveform switches from low PARR to high PARR, then the process moves along the path 820-2 to 810, and the trigger switches to the high linearity portion of the lookup table. These mode switches, which are represented by the paths 822-2 and 820-2, can be effected by writing at least one mode bit 362 in the index 352 of a lookup table 302 using the mode control signal 264. Because only one trigger write of one or more bits may be used to switch from low PARR (e.g., with low linearity mode) to high PARR (e.g., with high linearity mode) signal operation, or from high PARR (e.g., with high linearity mode) to low PARR (e.g., with low linearity mode) signal operation, the system can meet a stringent low latency requirement.

Figure 9:
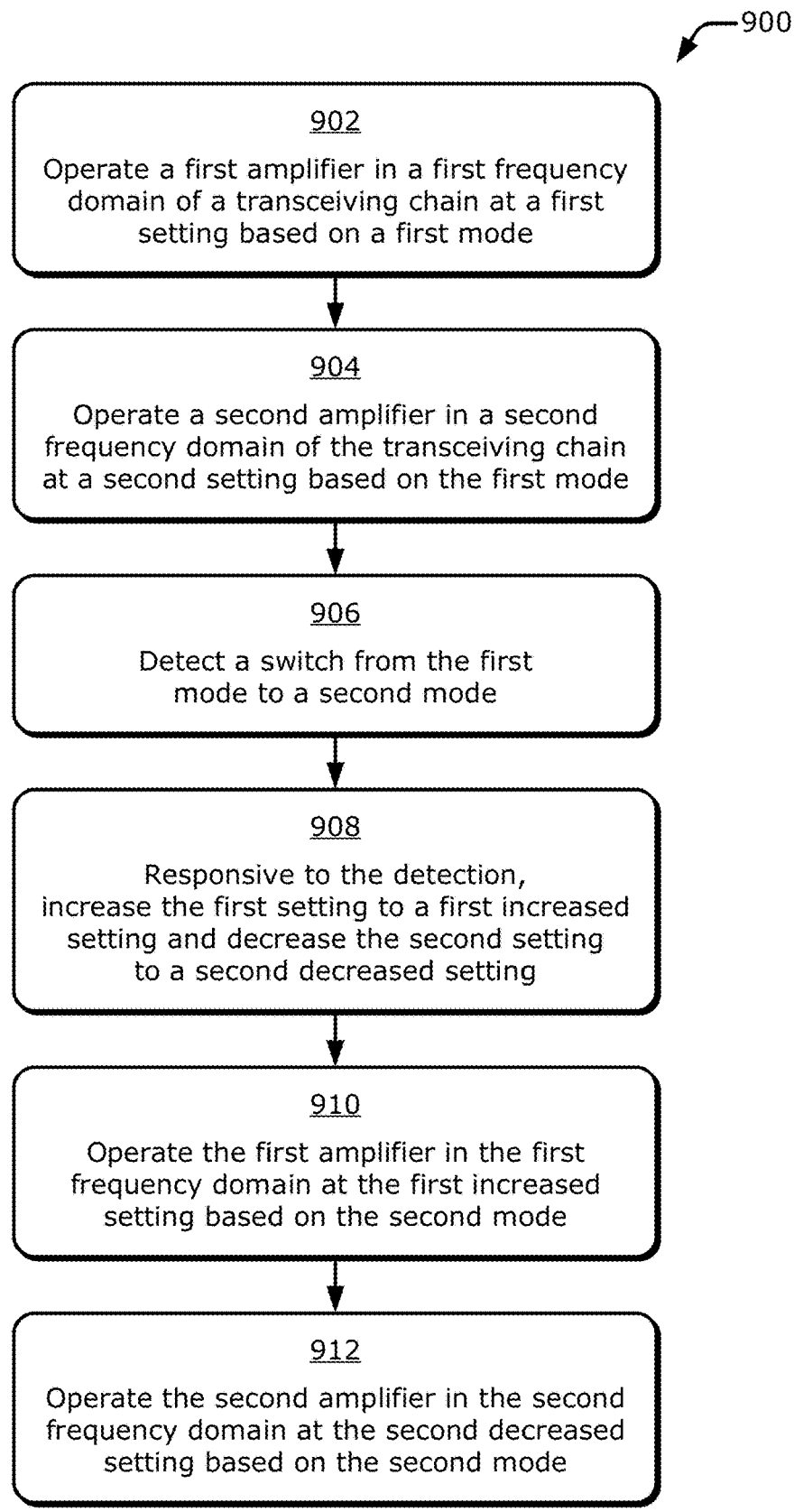
FIG. 9 is a flow diagram illustrating an example process for operating a multimode transceiver.

FIG. 9 is a flow diagram illustrating an example process 900 for operating a multimode transceiver with inverted setting changes over at least two amplifiers. The process 900 is described in the form of a set of blocks 902-912 that specify operations that can be performed. However, operations are not necessarily limited to the order shown in FIG. 9 or described herein, for the operations may be implemented in alternative orders or in fully or partially overlapping manners. Also, more, fewer, and/or different operations may be implemented to perform the process 900, or an alternative process. Operations represented by the illustrated blocks of the process 900 may be performed by an electronic device, such as the electronic device 102 of FIG. 1 or the wireless interface device 120 thereof. More specifically, the operations of the process 900 may be performed by the transmit chain 252 or the receive chain 202 in conjunction with the mode control circuitry 130 (e.g., of FIG. 2). A transceiving chain, such as the transmit chain 252 or the receive chain 202, may extend into or merge with an RF front-end 128, an antenna module, multiple antenna modules, and so forth.

At block 902, a first amplifier in a first frequency domain of a transceiving chain is operated at a first setting based on a first mode. For example, a transceiver 126 can operate a first amplifier 132 in a first frequency domain (e.g., an IF domain 406-1) of a transceiving chain (e.g., a receive chain 202 or a transmit chain 252, including both) at a first setting based on a first mode 402-1. The first setting may correspond to, for instance, a gain setting 414 or a bias setting 416. The setting may be established by a configuration value 376 or 404 from a register 304. The first mode may correspond to a lower linearity mode 412-2 or a higher linearity mode 412-1.

At block 904, a second amplifier in a second frequency domain of the transceiving chain is operated at a second setting based on the first mode. For example, the transceiver 126 can operate a second amplifier 136 in a second frequency domain (e.g., an RF domain 406-2) of the transceiving chain at a second setting based on the first mode 402-1. The second setting may also correspond to a gain setting 414 or a bias setting 416. A mixer 134 that can perform frequency translation or conversion may create or establish the first and second frequency domains. In other environments, the two domains may correspond to a BB frequency domain and an IF domain or a BB frequency domain and an RF domain.

At block 906, a switch from the first mode to a second mode is detected. For example, mode control circuitry 130 can detect a switch from the first mode 402-1 to a second mode 402-2. In some cases, a lookup table 302 of the mode control circuitry 130 may detect that at least one mode bit 362 of an index 352 has been written to with a new binary value by a mode control signal 264. The new binary value may be written in a second portion 350-2 of the lookup table 302, with the second portion 350-2 corresponding to the second mode 402-2. If the first mode 402-1 corresponds to a higher linearity mode 412-1, for instance, then the second mode 402-2 may correspond to a lower linearity mode 412-2.

At block 908, responsive to the detection, the first setting is increased to a first increased setting, and the second setting is decreased to a second decreased setting. For example, responsive to detecting that an index 352 has been changed, the mode control circuitry 130 may increase the first setting to a first increased setting and may decrease the second setting to a second decreased setting. If the first and second setting correspond to bias settings, for instance, the mode control circuitry 130 may increase a lower bias setting 416-11 to a higher bias setting 416-12 (e.g., of FIG. 4-3) of the amplifier 132 and may decrease a higher bias setting 416-31 to a lower bias setting 416-32 of the amplifier 136. In this instance, the switch of modes may be from the higher linearity mode 412-1 to the lower linearity mode 412-2.

At block 910, the first amplifier is operated in the first frequency domain at the first increased setting based on the second mode. For example, the transceiver 126 can operate the first amplifier 132 in the first frequency domain (e.g., the IF domain 406-1) at the first increased setting (e.g., at the higher bias setting 416-12) based on the second mode (e.g., the lower linearity mode 412-2). By doing so, power efficiency may be increased at the expense of using a simpler or lower-bandwidth modulation waveform. Here, the higher bias setting is shifted—responsive to the switch from the first mode to the second mode—to the amplifier operating in the lower frequency domain. Further, there may be less fanout for a transmit chain implementation in the lower frequency domain, which translates to fewer amplifiers operating at a given bias setting.

At block 912, the second amplifier is operated in the second frequency domain at the second decreased setting based on the second mode. For example, the transceiver 126 can operate the second amplifier 136 in the second frequency domain (e.g., the RF domain 406-2) at the second decreased setting (e.g., at the lower bias setting 416-32) based on the second mode (e.g., the lower linearity mode 412-2). By doing so, the amplifier in the higher frequency domain, which may also have a relatively greater quantity of amplifiers due to fanout in a transmit chain implementation, changes to a lower bias setting. This inverted settings adjustment can reduce power with a switch of the transceiver mode. Further adjusting the settings of the transceiving components can be performed with lower latency using a lookup table with different portions corresponding to the different transceiver modes.

Implementation of the detection at block 906 can include, for example, writing at least one bit (e.g., the mode bit 362) into an index 352 of a lookup table 302. The at least one bit may be indicative of switching from the first mode 402-1 to the second mode 402-2, with the lookup table 302 including a first portion 350-1 corresponding to the first mode and a second portion 350-2 corresponding to the second mode. Implementation of the increasing at block 908 can include, for example, routing a register-entry selection signal 306 from the lookup table 302 to a multiplexer 380 (e.g., of FIG. 3-4) that is coupled between a register 304 and the first amplifier (or, more generally, a component 308). The register 304 can include multiple register entries 374-1 . . . 374-16 that respectively store multiple configuration values 376 or 404 for the first amplifier (e.g., the amplifier 132).

As used herein, "couple," "coupled," or "coupling" refers to a relationship between two or more components that are in operative communication magnetically, electromagnetically, or by being electrically connected to implement some feature or realize some capability that is described. The term "connect," "connected," or "connecting" refers to an electrical connection using a physical line, such as a metal trace or wire. In some cases, an electrical connection can include a resistor, a capacitor, an inductor, a transistor, and so forth. A connection can include a direct connection or an indirect connection. A direct connection refers to connecting discrete circuit elements via a same node without an intervening element. An indirect connection refers to connecting discrete circuit elements via one or more other devices or other discrete circuit elements.

The terms "first," "second," "third," and other numeric-related indicators or differentiators are used herein to identify or distinguish similar or analogous items from one another within a given context. Here, such contexts can include a particular implementation, a given component, a single drawing figure or a group of related drawing figures, or a claim. Thus, a first item in one context may be the same as or may differ from a first item in another context. For example, an item identified as a "first amplifier" or a "first domain" in one context (e.g., in a transmit chain) may be identified for clarity purposes as a "second amplifier" or a "second domain," respectively, in another context (e.g., in a receive chain). Although various items and components that are illustrated in the drawings may be coupled together using single lines, the connecting lines and the associated items and components may operate with differential signaling or single-ended signaling.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description. Finally, although subject matter has been described in language specific to structural features or methodological operations, it is to be understood that the subject matter defined in the appended claims is not necessarily limited to the specific features or operations described above, including not necessarily being limited to the organizations in which features are arranged or the orders in which operations are performed.

What is claimed is:

1. An apparatus for transceiving signals in multiple modes, the apparatus comprising:
a transceiver comprising:
a first amplifier;
a mixer comprising at least one input node and at least one output node, the at least one input node coupled to the first amplifier;
a second amplifier coupled to the at least one output node of the mixer;
a first register coupled to the first amplifier;
a second register coupled to the second amplifier; and
at least one memory comprising a lookup table, the at least one memory coupled to the first register and the second register, the lookup table comprising a first portion corresponding to a first mode of the transceiver and a second portion corresponding to a second mode of the transceiver.

2. The apparatus of claim 1, wherein:
the first mode comprises a higher linearity mode; and
the second mode comprises a lower linearity mode.

3. The apparatus of claim 1, wherein the lookup table is configured to provide one or more configuration values to the first amplifier and the second amplifier using the first register and the second register, respectively, wherein the configuration values change between the first mode and the second mode in an inverted manner with respect to the first amplifier as compared to the second amplifier.

4. The apparatus of claim 3, wherein the lookup table is configured to provide the one or more configuration values such that if the one or more configuration values are increased for the first amplifier responsive to switching between the first mode and the second mode then the one or more configuration values are decreased for the second amplifier.

5. The apparatus of claim 1, wherein the lookup table comprises a third portion corresponding to a third mode of the transceiver.

6. The apparatus of claim 1, wherein the transceiver comprises a transmit chain that comprises the first amplifier, the mixer, and the second amplifier.

7. The apparatus of claim 1, wherein:
the first register is configured to hold at least one first configuration value that establishes at least one operational parameter of the first amplifier; and
the second register is configured to hold at least one second configuration value that establishes at least one operational parameter of the second amplifier.

8. The apparatus of claim 7, wherein:
the at least one operational parameter of the first amplifier comprises a bias setting; and
the at least one operational parameter of the second amplifier comprises a bias setting.

9. The apparatus of claim 8, wherein:
the bias setting for the first amplifier comprises at least one of a supply voltage level or a bias current magnitude; and
the bias setting for the second amplifier comprises at least one of a supply voltage level or a bias current magnitude.

10. The apparatus of claim 7, wherein:
the at least one operational parameter of the first amplifier comprises a gain setting; and
the at least one operational parameter of the second amplifier comprises a gain setting.

11. The apparatus of claim 7, wherein:
the transceiver comprises a third register;
the second register or the third register is coupled to the mixer and is configured to hold at least one third configuration value that establishes at least one operational parameter of the mixer; and
the at least one operational parameter of the mixer comprises at least one of a bias setting or a gain setting.

12. The apparatus of claim 1, wherein:
the lookup table is configured to store multiple entries;
each entry of the multiple entries comprises multiple entry selection bits that map to at least one register of multiple registers, the multiple registers comprising the first register and the second register;
the first register is configured to provide a configuration value from between two or more configuration values, which are held in the first register, to the first amplifier based on multiple entry selection bits of an entry of the multiple entries; and
the second register is configured to provide a configuration value from between two or more configuration values, which are held in the second register, to the second amplifier based on multiple entry selection bits of an entry of the multiple entries.

13. The apparatus of claim 12, wherein:
the transceiver further comprises at least one multiplexer coupled between the first register and the first amplifier; and
the first register is configured to provide the configuration value from between the two or more configuration values using the at least one multiplexer.

14. The apparatus of claim 1, wherein the lookup table comprises an index, the index comprising at least one mode bit that differentiates between at least the first portion and the second portion responsive to a mode control signal.

15. The apparatus of claim 14, wherein the index comprises at least one configuration bit that differentiates between multiple specified configurations within the first portion or within the second portion responsive to a specified-configuration control signal.

16. A method for transceiving signals in multiple modes, the method comprising:
operating a first amplifier in a first frequency domain of a transceiving chain at a first setting based on a first mode;
operating a second amplifier in a second frequency domain of the transceiving chain at a second setting based on the first mode;
detecting a switch from the first mode to a second mode;
responsive to the detecting, increasing the first setting to a first increased setting and decreasing the second setting to a second decreased setting;
operating the first amplifier in the first frequency domain at the first increased setting based on the second mode; and
operating the second amplifier in the second frequency domain at the second decreased setting based on the second mode.

17. The method of claim 16, wherein the detecting comprises:
writing at least one bit into an index of a lookup table, the at least one bit indicative of switching from the first mode to the second mode, the lookup table including a first portion corresponding to the first mode and a second portion corresponding to the second mode.

18. The method of claim 17, wherein the increasing comprises:
routing a register-entry selection signal from the lookup table to a multiplexer that is coupled between a register and the first amplifier, the register comprising multiple register entries that respectively store multiple configuration values for the first amplifier.

19. An apparatus for transceiving signals in multiple modes, the apparatus comprising:
   a mixer comprising at least one input node and at least one output node;
   a first amplifier coupled to the at least one input node of the mixer;
   a second amplifier coupled to the at least one output node of the mixer;
   means for establishing a first setting for the first amplifier and a second setting for the second amplifier based on a mode of a transceiver; and
   means for adjusting the first setting inversely compared to the second setting responsive to a switch between two modes of the transceiver.

20. The apparatus of claim 19, wherein the means for establishing comprises:
   means for holding multiple register entries, each respective register entry of the multiple register entries having a respective configuration value for at least one setting.

21. The apparatus of claim 20, wherein the means for adjusting comprises:
   means for selecting a register entry of the multiple register entries; and
   means for storing multiple entry selection bits, the means for storing coupled to the means for selecting.

22. The apparatus of claim 21, wherein the means for adjusting comprises:
   means for indexing into the means for storing the multiple entry selection bits responsive to a mode control signal.

23. The apparatus of claim 19, wherein:
   the switch between the two modes of the transceiver comprises a switch from a first mode to a second mode;
   the first setting comprises a first bias setting;
   the second setting comprises a second bias setting; and
   the means for adjusting comprises:
      means for increasing the first bias setting of the first amplifier responsive to the switch from the first mode to the second mode; and
      means for decreasing the second bias setting of the second amplifier responsive to the switch from the first mode to the second mode.

24. An apparatus for transceiving signals in multiple modes, the apparatus comprising:
   a mixer configured to perform frequency conversion between a first frequency domain and a second frequency domain;
   a first amplifier coupled to the mixer in the first frequency domain;
   a second amplifier coupled to the mixer in the second frequency domain; and
   mode control circuitry coupled to the first amplifier and the second amplifier, the mode control circuitry configured to:
      establish a first bias setting for the first amplifier and a second bias setting for the second amplifier based on a mode; and
      adjust the first bias setting inversely to the second bias setting responsive to a switch between two modes.

25. The apparatus of claim 24, wherein:
   the first frequency domain comprises an intermediate-frequency domain; and
   the second frequency domain comprises a radio-frequency domain.

26. The apparatus of claim 24, further comprising:
   at least one antenna; and
   a transmit chain, the transmit chain comprising the mixer, the first amplifier, and the second amplifier, wherein:
      the mixer comprises at least one input node and at least one output node;
      the first amplifier comprises a variable-gain amplifier that is coupled to the at least one input node of the mixer; and
      the second amplifier comprises a power amplifier that is coupled between the at least one output node of the mixer and the at least one antenna.

27. The apparatus of claim 26, further comprising:
   a wireless interface device comprising the transmit chain;
   a display screen; and
   at least one processor operatively coupled to the display screen and at least a portion of the wireless interface device, the at least one processor configured to present one or more graphical images on the display screen based on one or more wireless signals transmitted via the at least one antenna using the transmit chain.

28. The apparatus of claim 24, wherein the mode control circuitry is configured to adjust the first bias setting inversely to the second bias setting responsive to the switch between the two modes by at least one of:
   responsive to a switch from a first mode to a second mode, increasing the first bias setting and decreasing the second bias setting; or
   responsive to a switch from the second mode to the first mode, decreasing the first bias setting and increasing the second bias setting.

29. The apparatus of claim 24, wherein:
   the mode control circuitry comprises:
      at least one register; and
      at least one multiplexer coupled between the at least one register and the second amplifier, the at least one multiplexer comprising at least one control input; and
   the mode control circuitry is configured to adjust the second bias setting for the second amplifier responsive to the switch between the two modes using the at least one control input of the at least one multiplexer.

30. The apparatus of claim 29, wherein:
   the mode control circuitry comprises at least one lookup table; and
   the mode control circuitry is configured to adjust the second bias setting for the second amplifier responsive to the switch between the two modes using the at least one lookup table.

31. The apparatus of claim 30, wherein the at least one lookup table comprises:
   a first portion configured to store multiple entries, each entry of the multiple entries comprising an index and entry selection bits, the index of the first portion corresponding to a first mode of the two modes; and
   a second portion configured to store multiple entries, each entry of the multiple entries comprising an index and entry selection bits, the index of the second portion corresponding to a second mode of the two modes.

* * * * *